United States Patent [19]
Wang et al.

[11] Patent Number: 6,071,440
[45] Date of Patent: *Jun. 6, 2000

[54] CONTACT LENS PRODUCTION LINE PALLET SYSTEM

[75] Inventors: Daniel Tsu-Fang Wang, Jacksonville, Fla.; Kaj Bjerre, Ballerup, Denmark; Svend Christensen, Allinge, Denmark; Ture Kindt-Larsen, Holte, Denmark; Wallace Anthony Martin, Orange Park, Fla.; Craig William Walker; Michael Francis Widman, both of Jacksonville, Fla.

[73] Assignee: Johnson & Johnson Vision Products, Inc., Jacksonville, Fla.

[*] Notice: This patent is subject to a terminal disclaimer.

[21] Appl. No.: 09/208,230

[22] Filed: Dec. 9, 1998

Related U.S. Application Data

[62] Division of application No. 08/935,002, Sep. 22, 1997, Pat. No. 5,965,172, which is a continuation of application No. 08/731,019, Oct. 9, 1996, abandoned, which is a continuation of application No. 08/462,811, Jun. 5, 1995, abandoned, which is a division of application No. 08/257,786, Jun. 10, 1994, abandoned.

[51] Int. Cl.[7] .................................................. B29D 11/00
[52] U.S. Cl. ........................... 264/1.1; 264/102; 425/173; 425/808
[58] Field of Search ...................................... 264/1.1, 1.36, 264/1.38, 101, 102; 425/808, 173

[56] References Cited

U.S. PATENT DOCUMENTS

| | | |
|---|---|---|
| 4,402,659 | 9/1983 | Greenbaum . |
| 4,786,444 | 11/1988 | Hwang . |
| 5,252,056 | 10/1993 | Horner et al. . |
| 5,656,208 | 8/1997 | Martin et al. ............................ 264/1.1 |

*Primary Examiner*—Mathieu D. Vargot

[57] ABSTRACT

A contact lens production line pallet system transports contact lens mold materials throughout a facility for producing ophthalmic lenses. Specifically, the contact lens production line pallet system includes a pallet for carrying one or more contact lens mold assemblies throughout a contact lens production line, the pallet having one or more first recesses formed in a surface thereof for receiving either a first mold half or a complementary second mold half, the first and second mold halves when placed together constitute an individual contact lens mold assembly. A conveyor device for transporting the pallet from station to station throughout the production line facility is provided, as is a locating device formed in the pallet surface for enabling precise positioning of the pallet at one or more manufacturing stations in the production line facility.

7 Claims, 25 Drawing Sheets

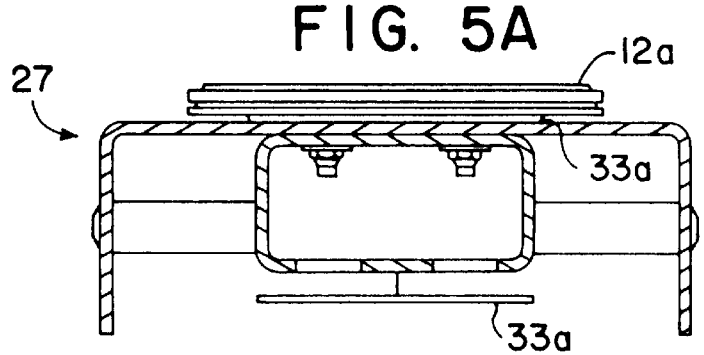
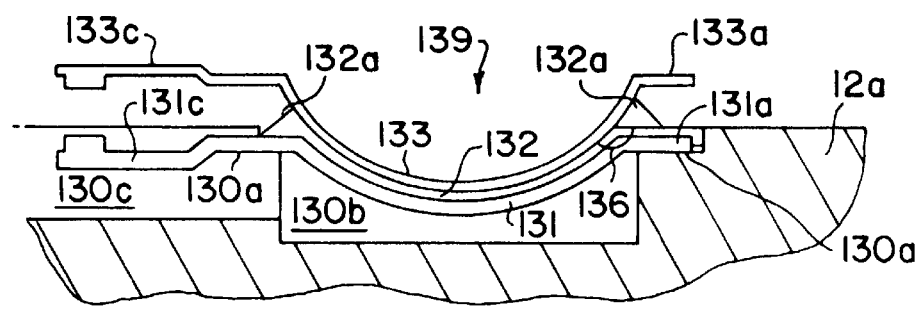
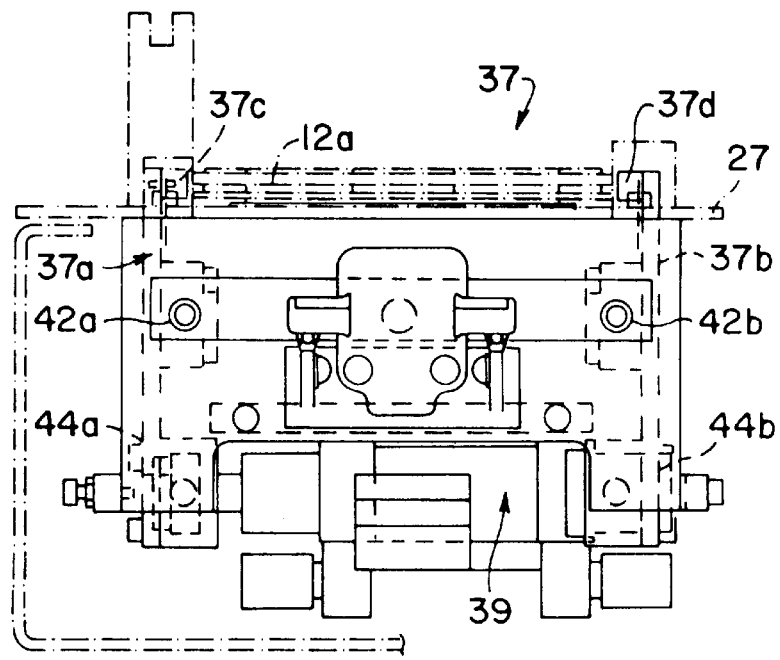

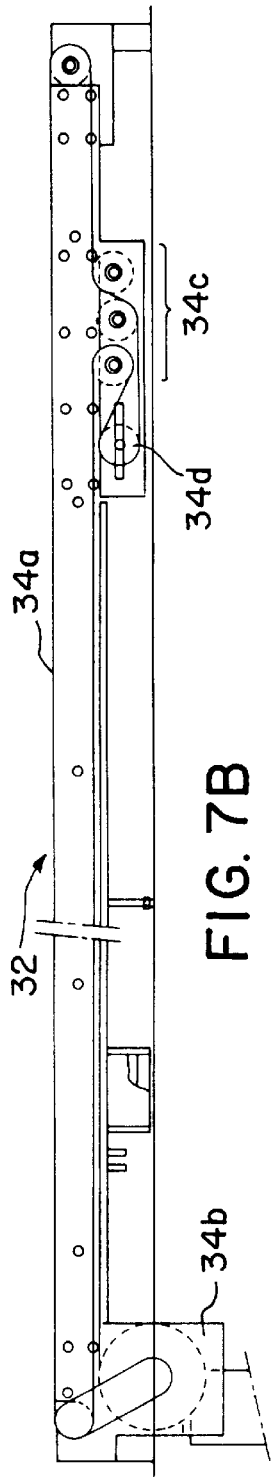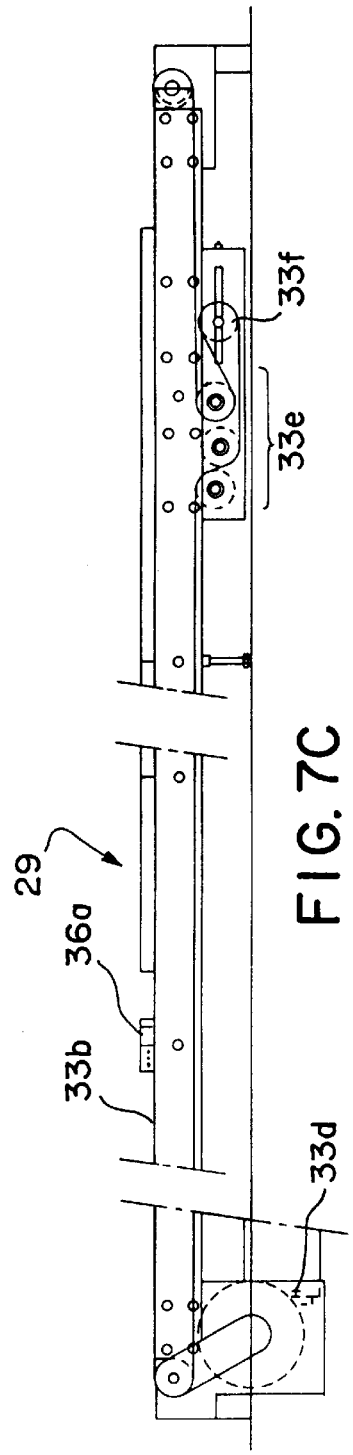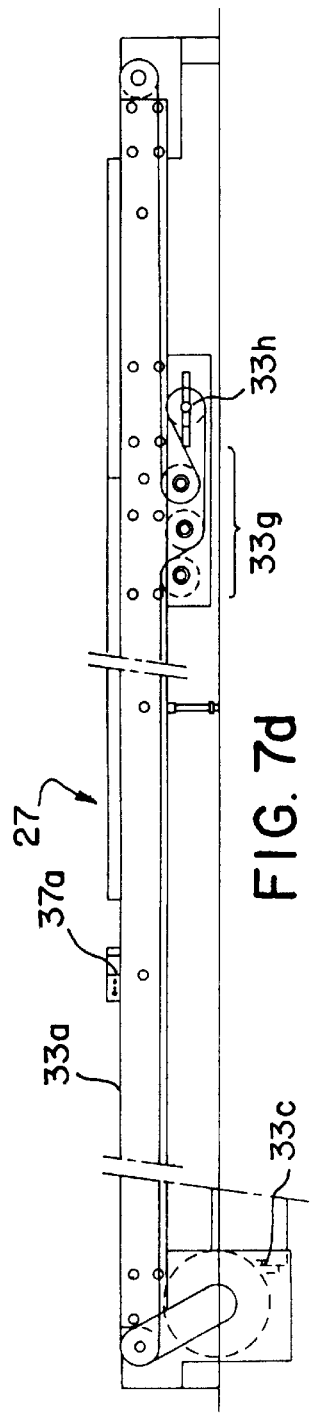

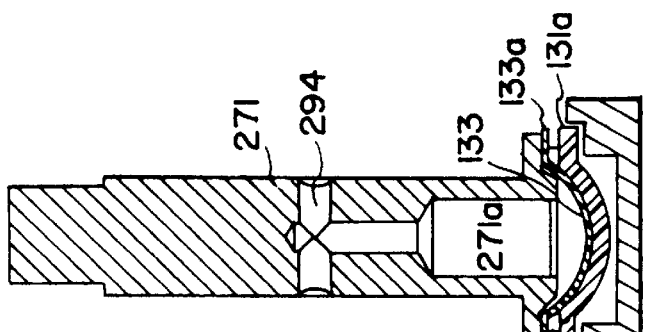
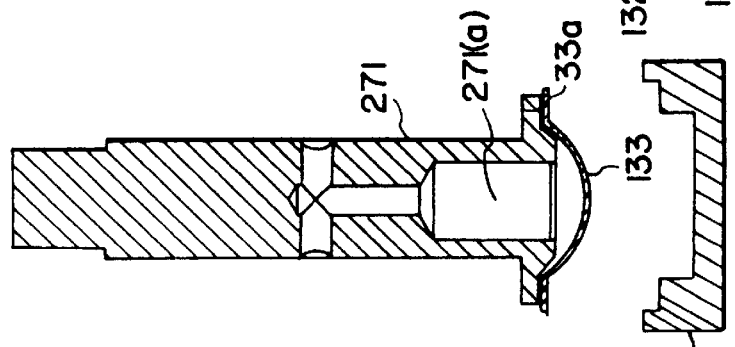
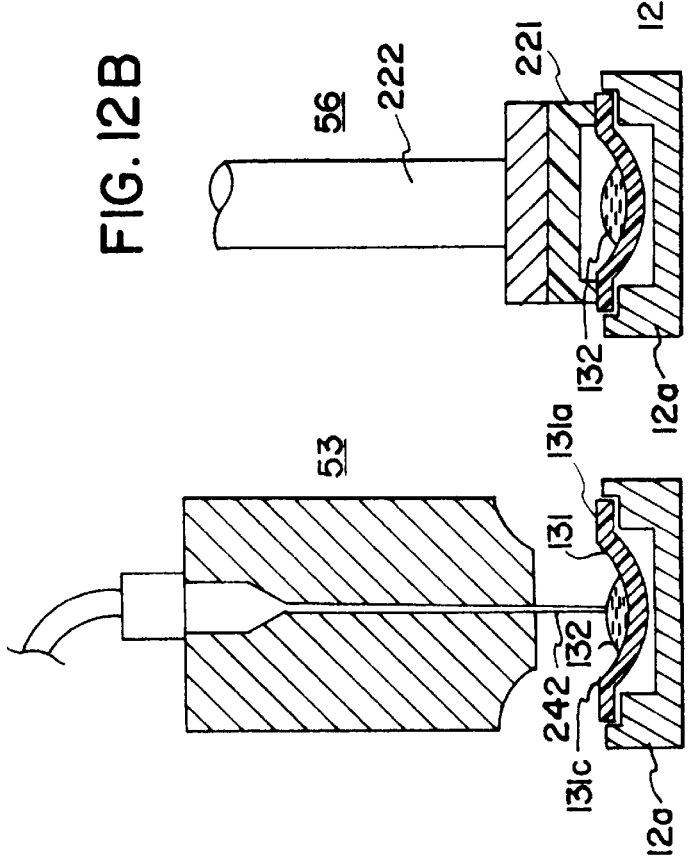
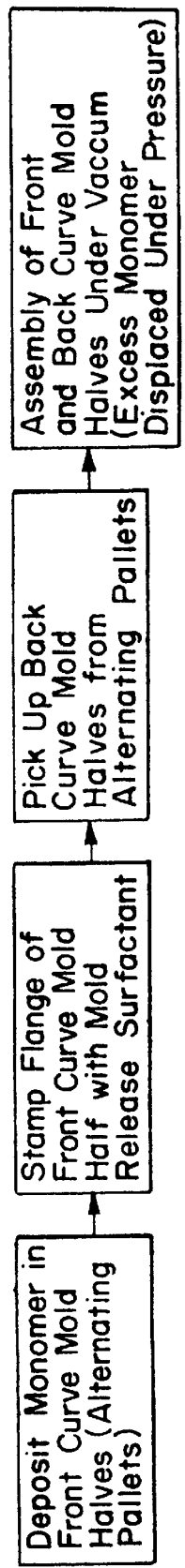

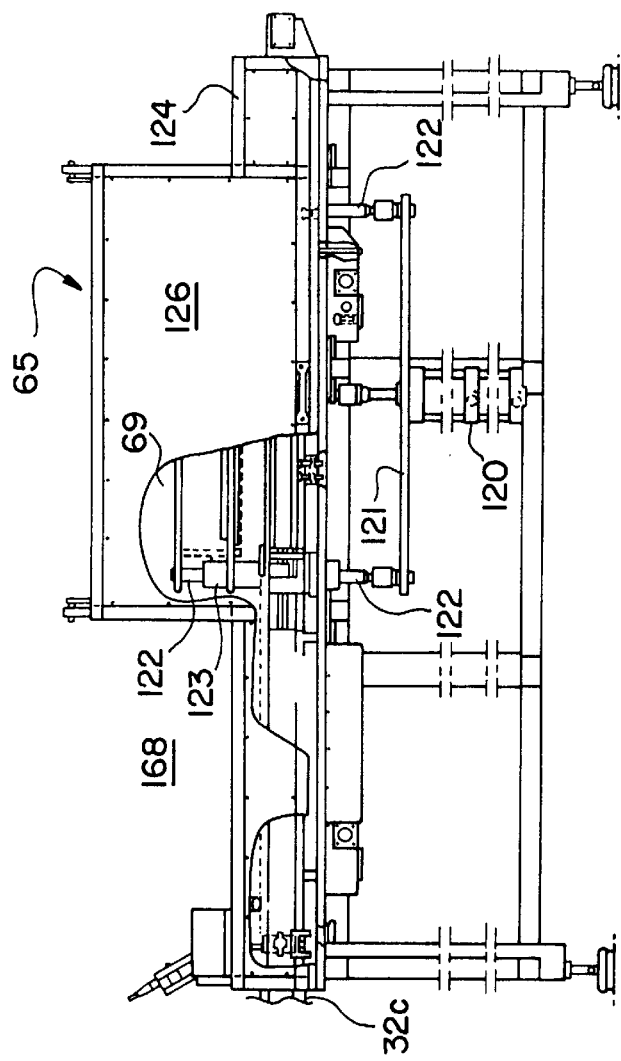
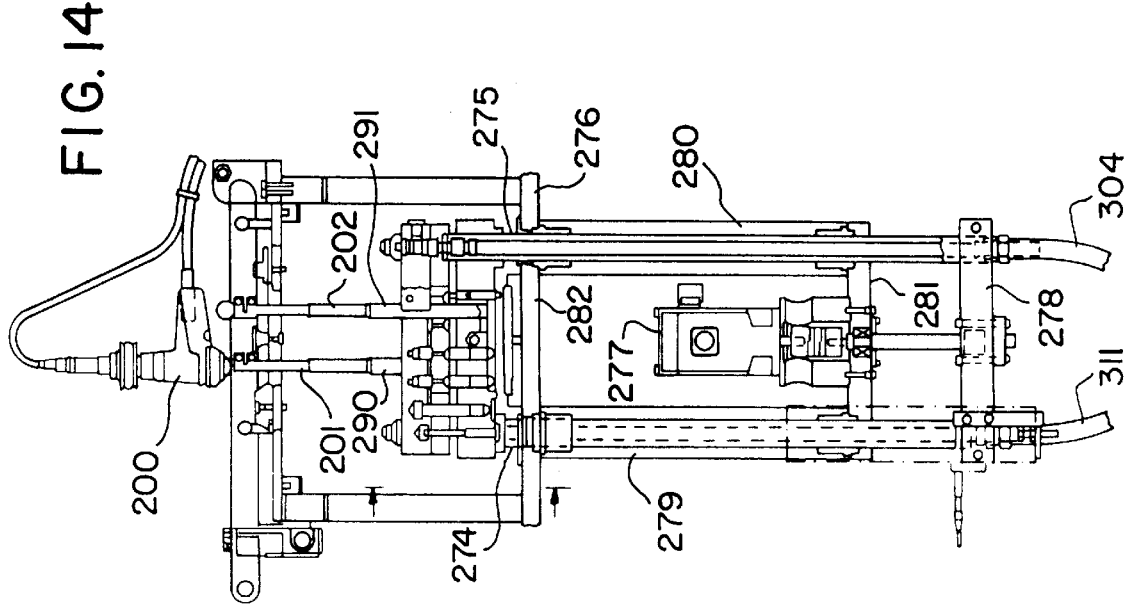

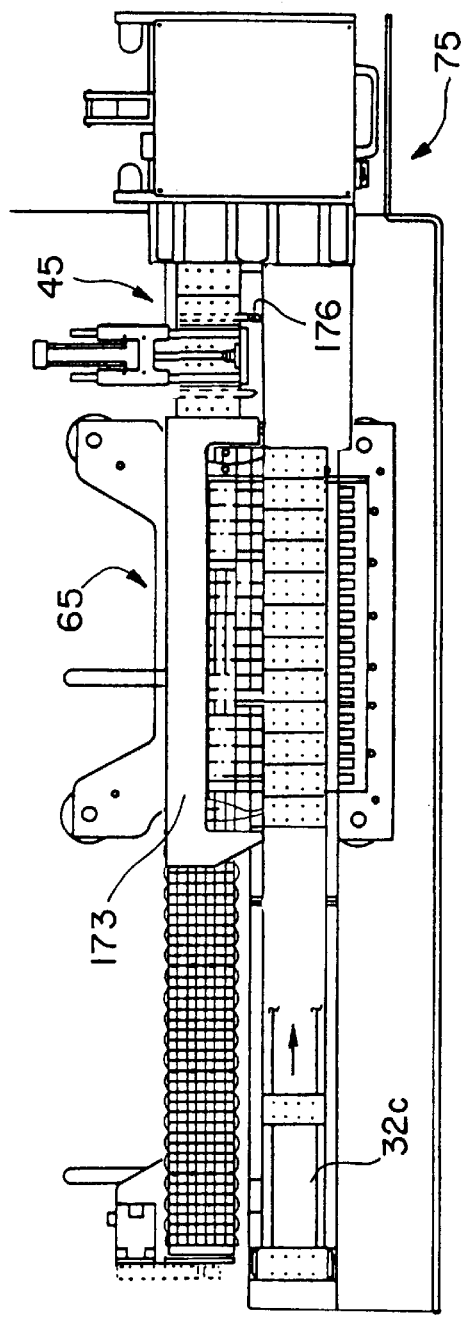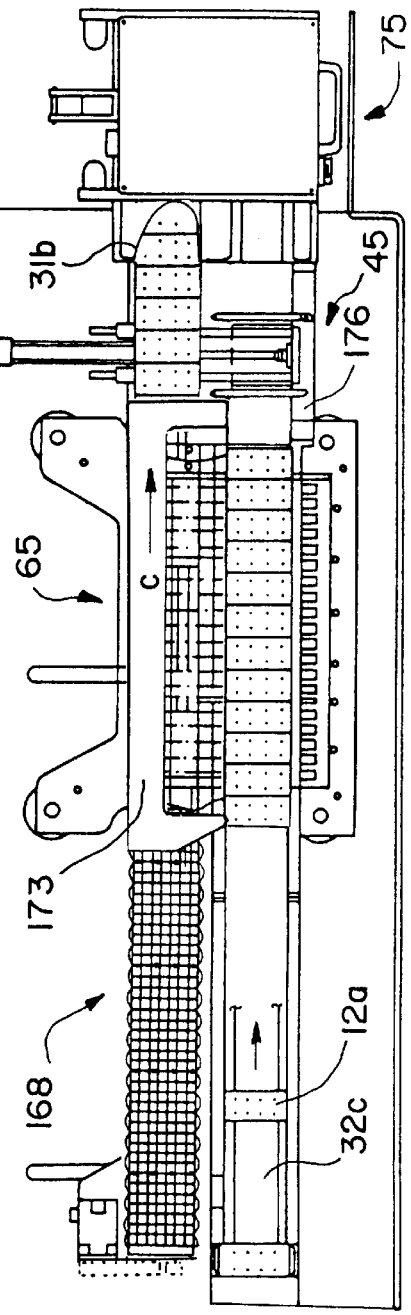

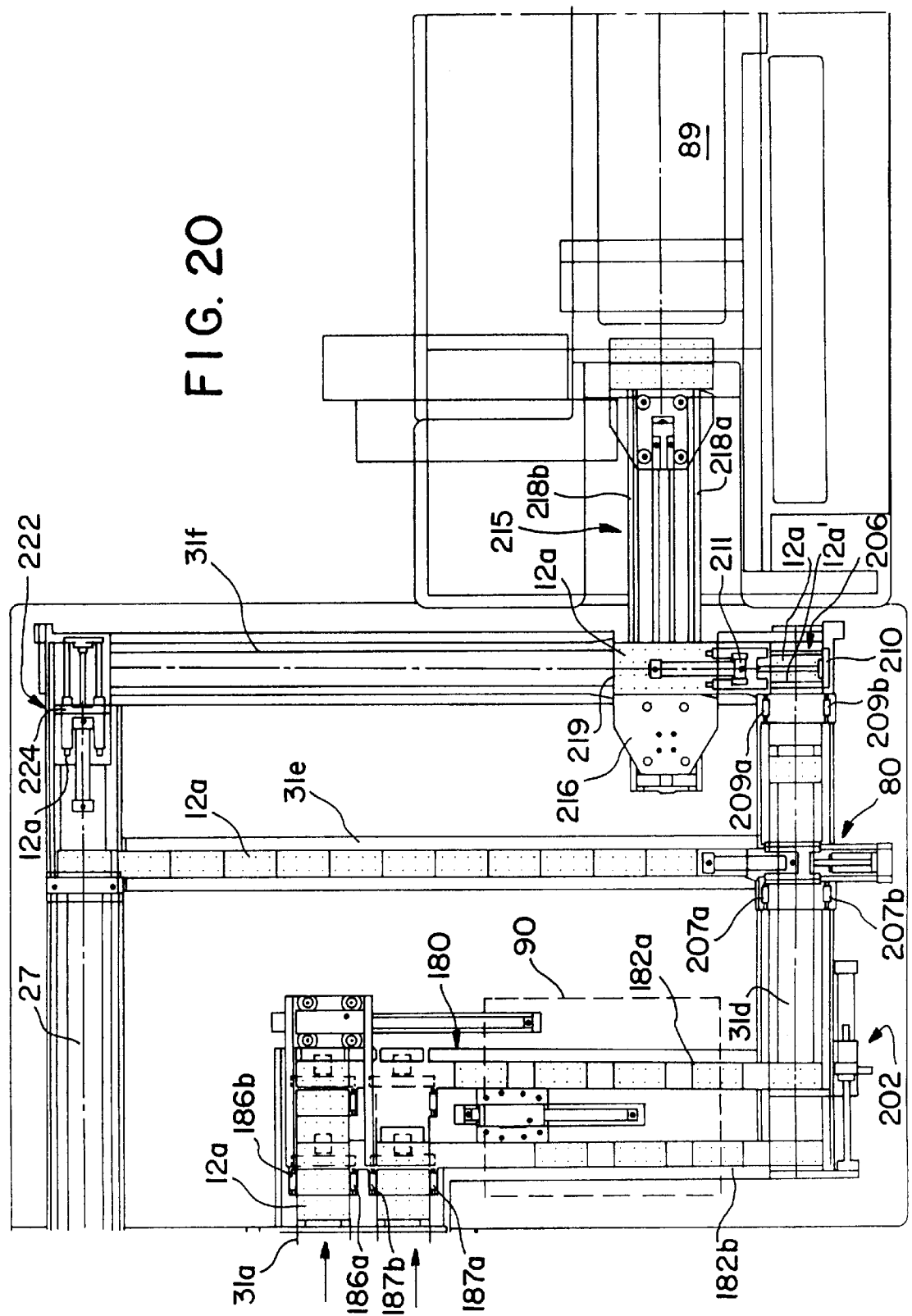

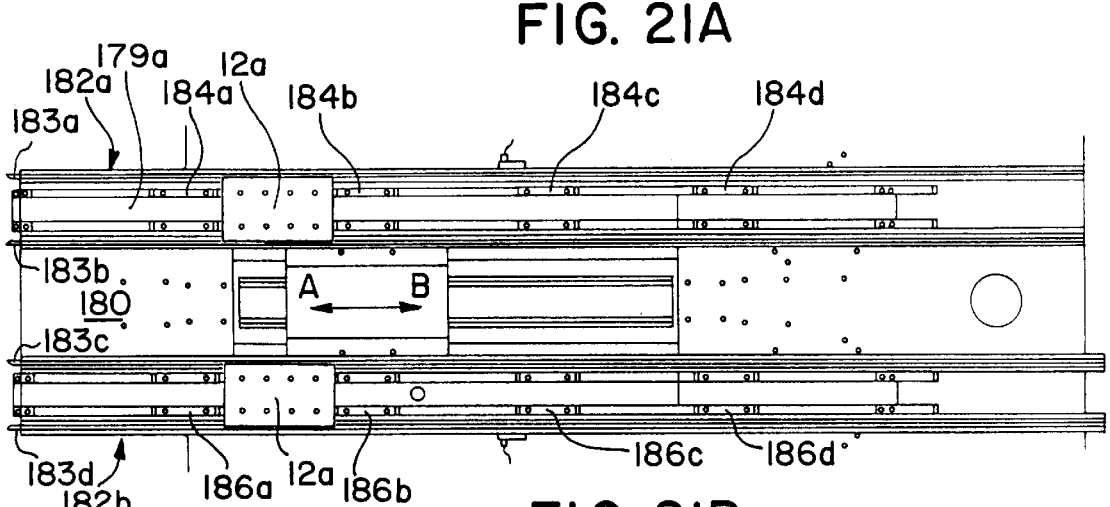
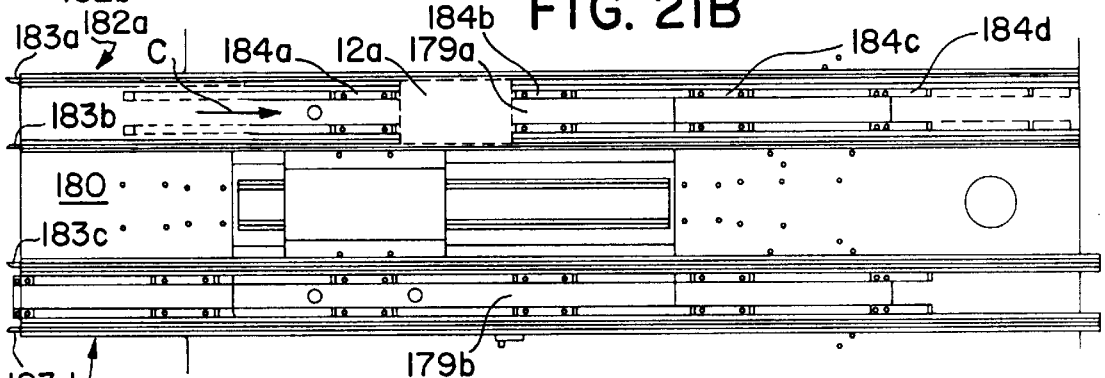
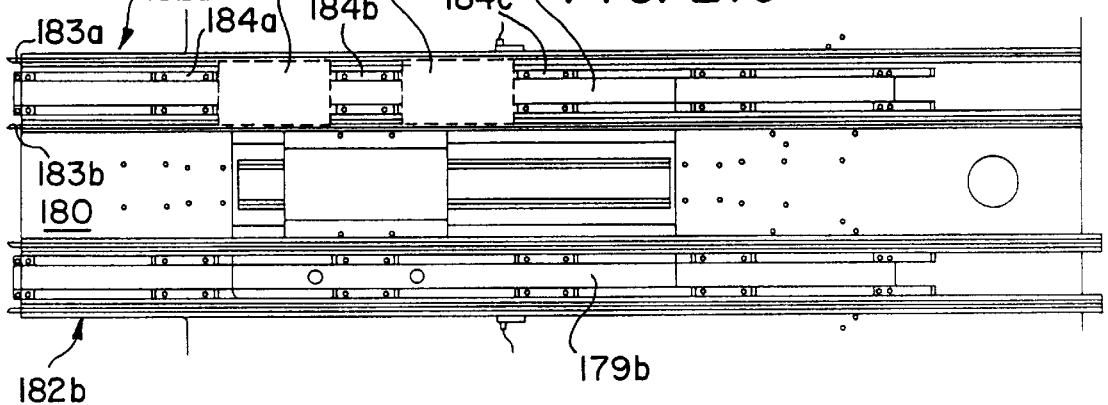

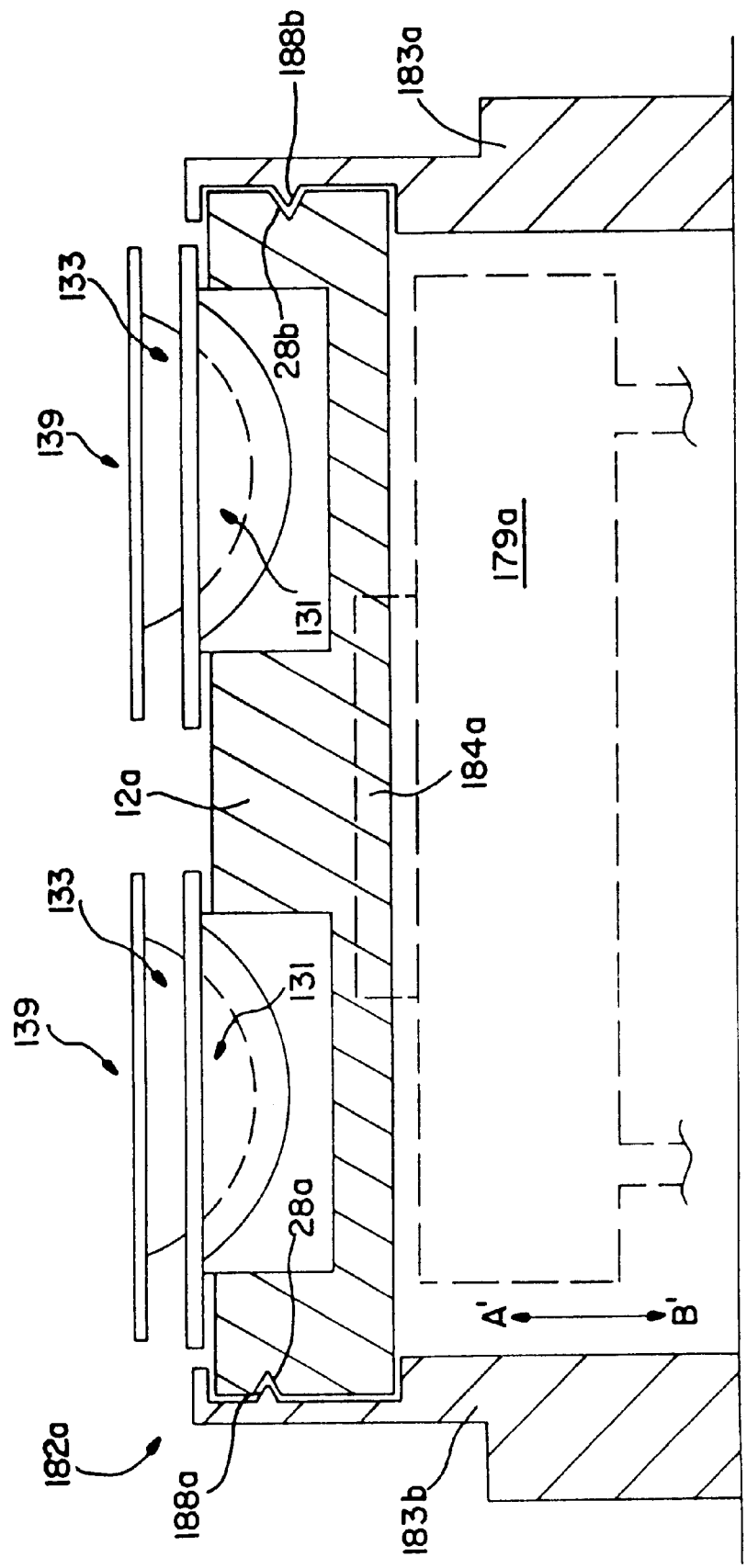

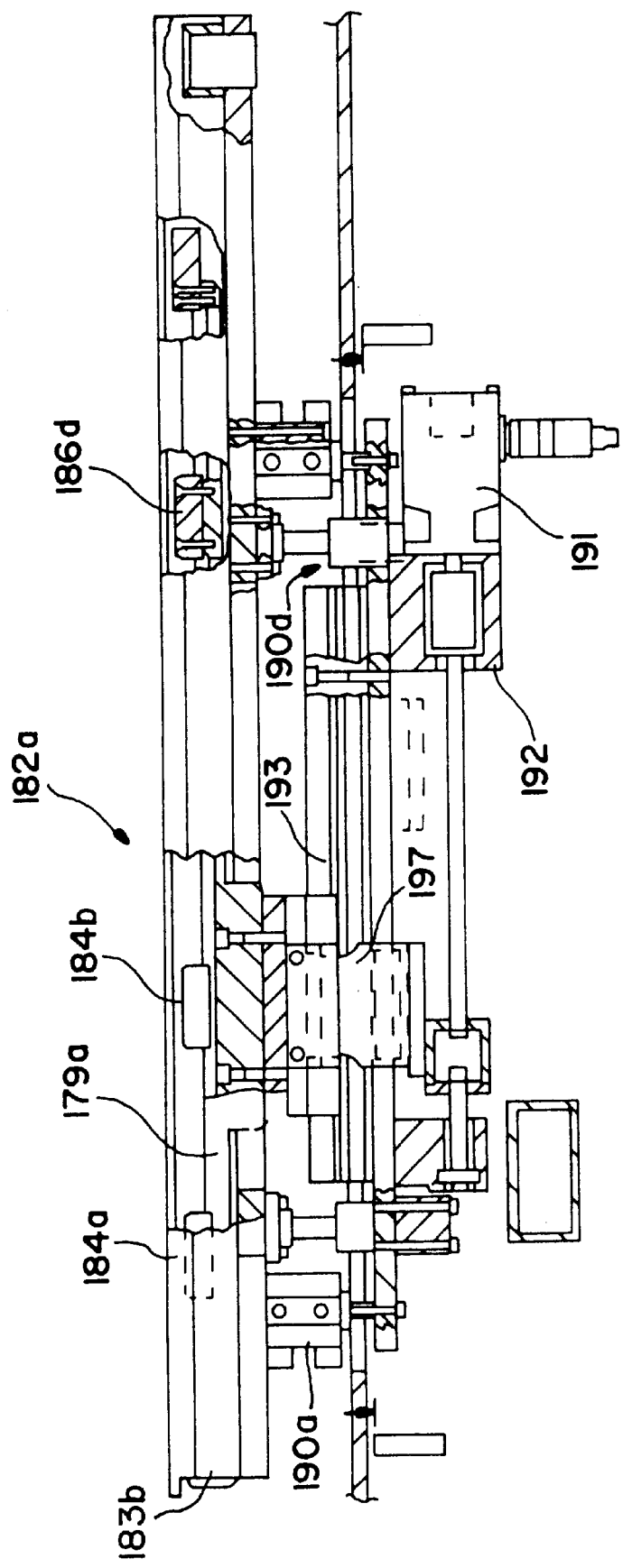

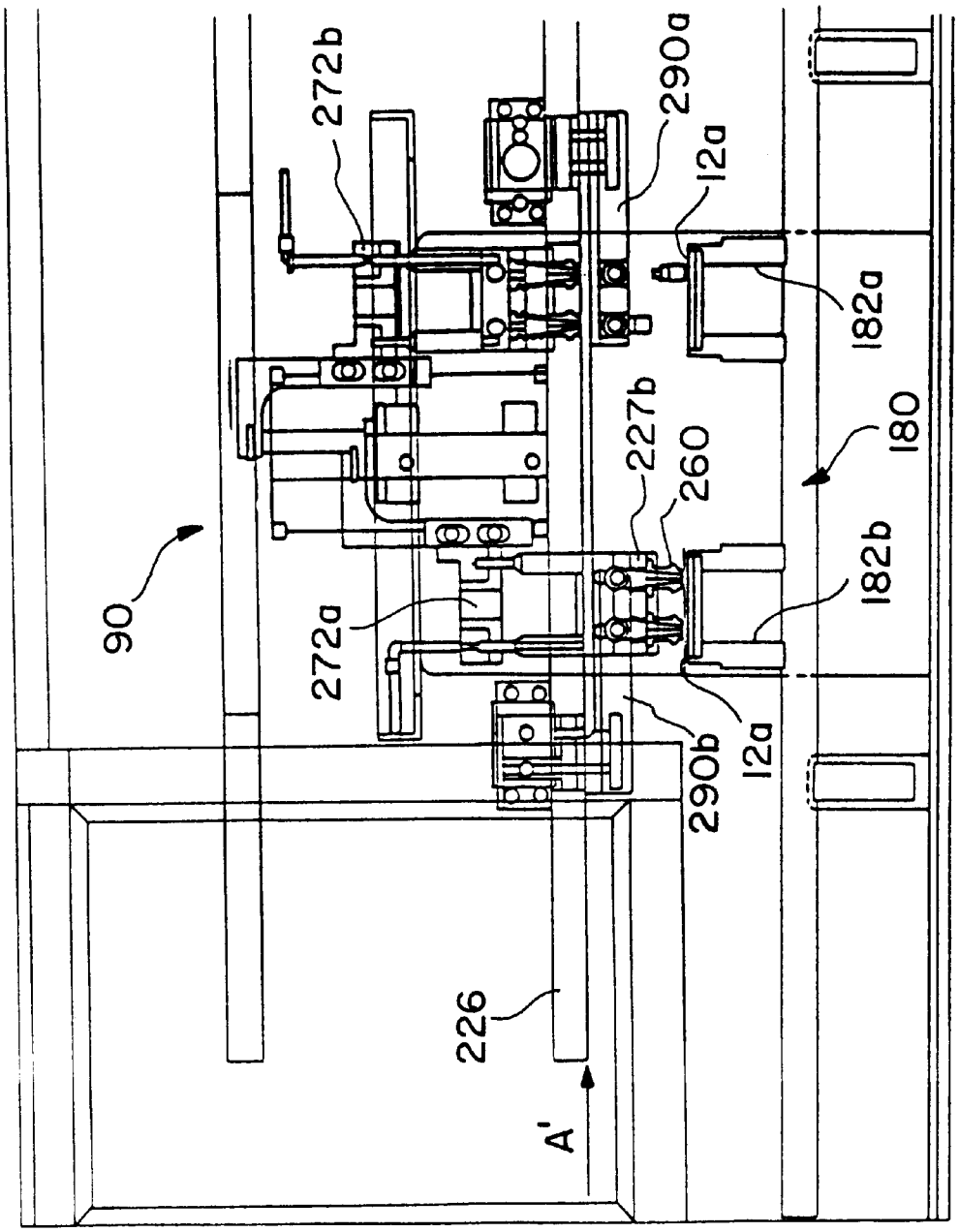

CONTACT LENS PRODUCTION LINE PALLET SYSTEM

This application is a divisional application of Ser. No. 08/935,002, filed Sep. 22, 1997, now U.S. Pat. No. 5,965, 172, which is a continuation application of Ser. No. 08/731, 019, filed Oct. 9, 1996, now abandoned, which is a continuation application of Ser. No. 08/462,811, filed Jun. 5, 1995, now abandoned, which is a divisional application of Ser. No. 08/257,786, filed Jun. 10, 1994, now abandoned.

FIELD OF THE INVENTION

This invention relates generally to the production of ophthalmic lenses, and, in particular to a pallet system including carriers for receiving contact lens mold halves, and a conveyor system for transporting the carriers containing the mold halves throughout a production facility for automatically producing ophthalmic contact lenses.

DESCRIPTION OF THE PRIOR ART

The direct molding of hydrogel contact lenses is disclosed in U.S. Pat. No. 4,495,313 to Larsen, U.S. Pat. No. 4,680, 336 to Larsen et al., U.S. Pat. No. 4,565,348 to Larsen, and U.S. Pat. No. 4,640,489 to Larsen et al., the entire disclosures of which are hereby incorporated by reference in this patent application. Essentially, these references disclose an automated contact lens production process wherein each lens is formed by sandwiching a monomer between back curve (upper) and front curve (lower) mold halves. The monomer is polymerized, thus forming a lens, which is then removed from the mold halves and further treated and packaged for consumer use.

At the present time, automated and semi-automated processes are used in the production of soft contact lens, however, high transport speeds necessary for high production rates are not achievable, partly due to the strict process controls and tight tolerances necessary in the production of high quality contact lenses.

As disclosed in the above-identified U.S. Pat. No. 4,565, 348 to Larsen, a plurality of male mold halves having convex molding surfaces and a plurality of female mold halves having concave molding surfaces are supported on plastic frames during the soft contact lens production process. One disadvantage to this method is that production costs are increased due to the increased cycle time for molding of the plastic frame and lens mold halves supported thereby. Since the frame is supportive it naturally requires an increased amount of source materials, further adding to the production cost. Additionally, the injection molded frame for carrying the lens mold halves may not produce the proper support as it may be subject to shrinkage and warpage which can interfere with the system integrity. Furthermore, the injection molded frame is not reusable and is eventually discarded after processing, thus, further adding to production costs.

It would therefore be highly desirable to provide a completely automated production line pallet system that uses a series of re-usable pallets of sturdy construction to carry contact lens mold halves throughout a contact lens manufacturing facility to thereby eliminate the need for an injection molded support frame for said mold halves.

It would also be highly desirable to provide a completely automated production line pallet system that uses a series of re-usable pallets of sturdy construction to reduce lens mold production cycle time and minimize production costs.

It would additionally be highly desirable to incorporate a completely automated production line pallet system for automatically transporting in a fast and efficient manner contact lens mold portions on a pallet throughout a contact lens manufacturing facility that includes filling, mold assembly, pre-cure, polymerizing, and de-molding stations.

It would additionally be desirable to have in a contact lens manufacturing facility, a production line pallet system that facilitates the manufacture of ophthalmic contact lenses at a high production rate.

Moreover, it would be highly desirable to have in a contact lens manufacturing facility, a production line pallet system wherein a single carrier pallet contains recesses for carrying either front curve lens mold halves or back curve lens mold halves.

Furthermore, it would be highly desirable to have in a contact lens manufacturing facility, a production line pallet system wherein the carrier pallets for carrying the mold halves includes means for enabling precision location of the pallet within the various stations of the production line facility.

It would also be highly desirable to provide a conveyor means for transporting the carrier pallets in serial and batch modes throughout the various stations of a contact lens manufacturing facility.

SUMMARY OF THE INVENTION

An object of the present invention to provide a completely automated production line pallet system that uses a series of re-usable pallets each of sturdy construction to carry both contact lens front curve and back curve mold halves throughout a contact lens manufacturing facility and eliminate the need for an injection molded support frame for said mold halves.

Another object of the invention is to provide a completely automated production line pallet system that uses a series of re-usable pallets of sturdy construction to reduce lens mold production cycle time and minimize production costs.

It is an object of the present invention to incorporate a completely automated production line pallet system for automatically transporting contact lens mold halves throughout the contact lens filling, precuring, polymerizing, and demolding stations in a contact lens manufacturing facility in a fast and efficient manner.

It is a further object of the present invention to incorporate an automated production line pallet system in a contact lens manufacturing facility, that facilitates the manufacture of ophthalmic contact lenses at a high production volume.

Another object of the present invention is to incorporate in a contact lens production line facility, an automated production line pallet system wherein a carrier pallet is provided that can receive either front curve lens mold halves and back curve lens mold halves.

It is a further object of the present invention to incorporate in a contact lens production line facility, an automated production line pallet system, wherein the carrier pallets that receive and transport respective front curve and back curve lens mold halves are continuously recirculated after the removal of the mold halves therefrom.

It is yet still a further object of the present invention to incorporate in a contact lens production line facility, an automated production line pallet system wherein a carrier pallet is provided that includes means for enabling precise positioning of the pallet at one or more stations within the facility.

It is still another object of the present invention to incorporate in a contact lens production facility, an automated production line pallet system that transports carrier pallets in either serial and batch modes, depending upon the processing station, and provides means for enabling pallets to switch from serial to batch mode prior to entering specific processing stations, and means for enabling pallets to switch from batch mode back to serial mode after exiting specific processing stations.

Yet still another object of the present invention is to provide an automated production line pallet system in a contact lens manufacturing facility, wherein the pallet system includes means for interleaving pallets containing front curve lens mold halves with pallets containing back curve lens mold halves prior to deposition of monomer solution in the front curve lens mold and the formation of the contact lens mold assembly.

Yet even another object of the instant invention is to provide an automated production line pallet system in a contact lens manufacturing facility that incorporates bar code identification means enabling specific pallet rejection for enhanced quality control and production efficiency.

Moreover, another object of the present invention is to provide an automated production line pallet system in a contact lens manufacturing facility, wherein the pallet system is enclosed in a nitrogen environment throughout various portions of the facility.

Yet another object of the present invention is to provide an automated production line pallet system in a contact lens manufacturing facility, wherein a carrier pallet is provided that includes means for enabling deposition of material to front curve lens mold halves and the assembly of front curve and back curve lens mold halves to create a mold assembly in a vacuum environment.

It is still yet another object of the present invention to provide an automated production line pallet system in a contact lens manufacturing facility, wherein the pallet carriers enable the support of individual contact lens mold halves without the need for additional matrix or frame to connect the mold halves.

Moreover, it is still yet another object of the present invention to provide an automated production line pallet system in a contact lens manufacturing facility, wherein the pallet carriers are provided with individual recesses of predetermined depth that enable protection of lens mold half optical surfaces.

The above objects are achieved by a contact lens production line pallet system that transports the contact lens mold materials throughout the facility for producing ophthalmic lenses. Specifically, the contact lens production line pallet system includes a pallet for carrying one or more contact lens mold assemblies throughout a contact lens production line, the pallet having one or more first recesses formed in a surface thereof for receiving either a first mold half or a complementary second mold half, the first and second mold halves when placed together constituting an individual contact lens mold assembly. A conveyor means for transporting the pallet from station to station throughout the production line facility is also provided, wherein a locating means is formed in the pallet surface for enabling precise positioning of the pallet at one or more stations in the production line facility.

Further benefits and advantages of the invention will become apparent from a consideration of the following detailed description given with reference to the accompanying drawings, which specify and show preferred embodiments of the invention.

BRIEF DESCRIPTION OF THE DRAWINGS

The foregoing objects and advantages of the present invention for a contact lens production line pallet system may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 5(a) is a front, cross-sectional view of a production line pallet 12a (or 12b) carried along a conveyor belt of the instant invention.

FIG. 5(b) is a detailed view of a contact lens mold assembly 139 comprising complementary first and second mold halves 131,133 situated in a recess of a production line pallet 12a.

FIG. 6 is a front, cross-sectional view of the preferred clamping mechanism 37 used to temporarily halt motion of a pallet along a conveyor;

FIG. 7(b) illustrates the drive belt and drive motor assembly for sequenced pallet conveyor 32.

FIG. 7(c) illustrates the drive belt and drive motor assembly for back curve supply conveyor 29.

FIG. 7(d) illustrates the drive belt and drive motor assembly for front curve supply conveyor 27.

FIGS. 12(a)–12(d) is a diagrammatic and illustrated flow diagram of the filling/mold assembly apparatus.

FIG. 12(e) is a block diagram flow chart illustrating conceptually the sequence of steps for monomer filling and contact lens mold assembly.

FIG. 14 is a diagrammatic and partially cross-sectioned illustration of the assembly station 59 illustrating the vacuum supplies for the reciprocating assembly station.

FIGS. 15(a)–15(e) illustrate the sequence for enabling batch processing of mold assemblies at the mold clamping and precure apparatus 65;

FIG. 16 is a partially cut away elevation view of pallet conveyor 32c transporting pallets through precure and mold clamping apparatus 65;

FIG. 20 illustrates the back end of the production line pallet system showing the sequence for transferring pallets from dual conveyors 31a,b to the demold assembly, and the sequence for transferring pallets from conveyor 31d to the transfer apparatus 215 for transfer to the hydration chamber.

FIGS. 21(a)–21(c) illustrate the sequence for advancing pallets on transport carriers 182a,b of dual walking beam 180, at a demolding station that requires precise registration of pallets.

FIG. 21(d) illustrates a pallet advancing along carrier guide tracks 183a,b and guided by notches 188a,b.

FIG. 22 illustrates a partially cut side view of dual walking beam 180.

FIG. 23(b) illustrates a front elevational view of the steam heat assembly applying steam heat to a pallet 12a carrying mold assemblies.

DESCRIPTION OF THE PREFERRED EMBODIMENT

Figure 1:
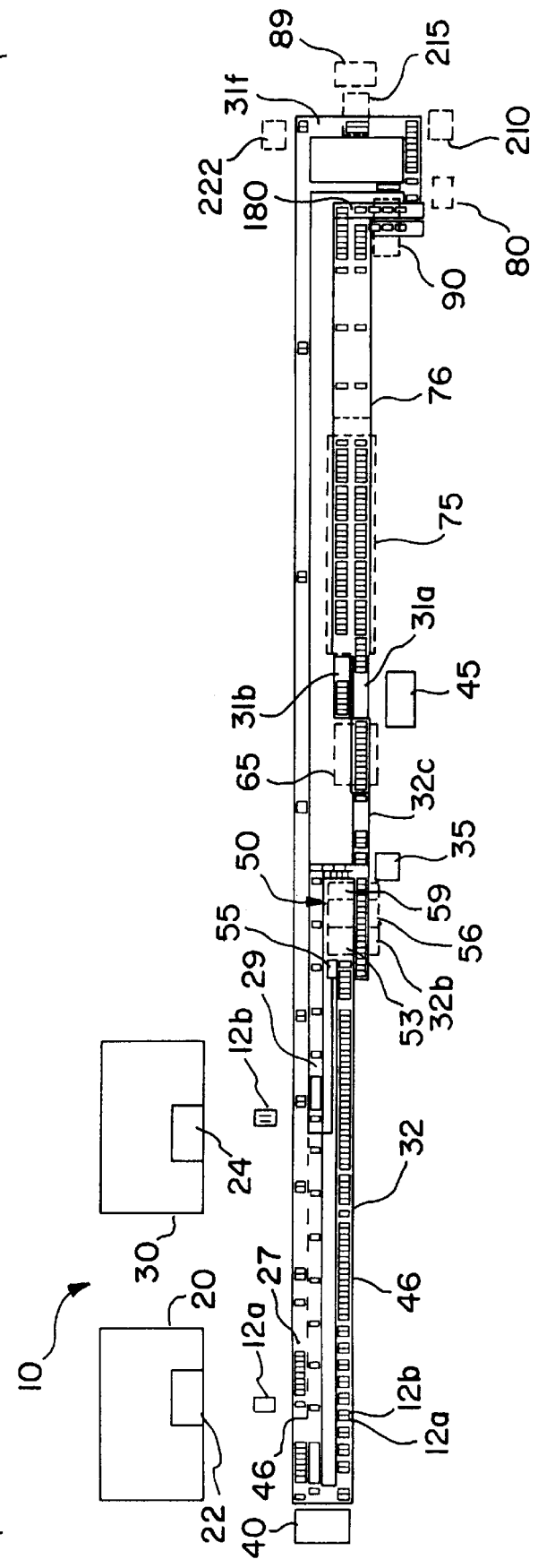
FIG. 1 is a diagrammatic top view of the production line pallet system constructed according to the present invention.

Referring to FIG. 1, there is shown a contact lens production line pallet system 10 constructed according to the present invention. As will be described in further detail below, the pallet system 10 generally comprises: an injection mold assembly 20 for manufacturing contact lens thermoplastic front curve mold halves and an injection mold assembly 30 for manufacturing contact lens thermoplastic back curve mold portions; the front curve injection mold assembly 20 including an apparatus 22 for transporting up to eight front curve mold portions at a time from the injection mold assembly 20 to a pallet 12a positioned adjacent a first pallet conveyor 27 and the back curve injection mold assembly 30 including an apparatus 24 for transporting up to eight back curve mold portions at a time within a pallet 12b positioned adjacent to a second pallet conveyor 29; a sequencing apparatus 40 for situating a pallet 12a containing front curve mold portions adjacent a pallet 12b containing a corresponding number of complementary back curve mold portions onto a sequenced pallet conveyor 32 wholly contained in a low oxygen environment comprising a tunnel 46 of inert $N_2$ gas, where the pallets 12a,12b are conveyed alternately with the pallet 12b containing back curve halves first, followed immediately thereafter by a pallet 12a loaded with front curve mold halves, into the filling and mold assembly stations 50 sequentially at the rate of approximately 1 pallet each 6 seconds. As illustrated in FIG. 1 and the conceptual flow diagram of FIG. 12(e), the filling/mold assembly station 50 generally includes: a first apparatus 53 for depositing, in an optional vacuum environment, a polymerizable compound (monomer mixture) for forming a contact lens in the concave portion of each front curve lens mold portion in pallet 12a; a second apparatus 56 for depositing a surfactant along a annular rim portion of the front curve for facilitating the later removal of the back curve mold portion and the cured excess monomer (HEMA ring) from the front curve mold portion in a mold separation apparatus 90 located downstream of the filling apparatus 50; and, a third apparatus 59 for assembling the individual contact lens mold assemblies which consists of simultaneously placing each back curve lens mold from pallet 12b on an associated front curve lens mold located on conveyor pallet 12a in an oriented configuration. The simultaneous placing of each back curve lens mold from pallet 12b on an associated front curve lens mold on conveyor pallet 12a takes place in a vacuum environment. Additionally, as shown in FIG. 1, after the back curves are removed from the second pallet 12b, a pallet recirculating ram assembly 35 pushes the empty back curve pallets 12b back to the original back curve assembly conveyor 29 for receipt of a new set of back curve lens mold portions from injection mold assembly 30.

As illustrated in FIG. 1, the pallets 12a containing completed mold assemblies exit the filling/mold assembly stations 50 and are conveyed along conveyor 32c to a precure chamber 65 where the monomer solution contained in each mold assembly is partially cured into a viscous or soft gel-like state and where the front and back curve lens molds are subject to a predetermined pressure to further define the contact lens edges, and, to eliminate decentration.

After exiting the precure chamber 65, the pallets containing the precured lenses are transported along conveyor 32c to a polymerization chamber 75 where the precured lenses contained in the individual mold assemblies are fully polymerized in UV light ovens to form the contact lens blank. As shown in FIG. 1, the sequenced pallet conveyor 32c is split into two conveyors, 31a and 31b, to enable a longer residence time in the polymerization chamber as the mold assemblies are polymerized. Pusher apparatus 45 is used to direct the travel of a predetermined amount of pallets containing the mold assemblies from conveyor 32c to each of the two conveyors 31a,b.

After the polymerizable compound in each of the mold assemblies are polymerized to form a contact lens blank in the polymerization chamber 75, the pallets travel through a de-mold buffer area 76 providing temperature adjustment to the mold assemblies exiting the ovens, and along a dual walking beam 180 to a back end of the pallet system 10 that includes a mold separation apparatus 90 where the back curve lens mold halves of the mold assemblies are automatically separated from the front curve lens mold halves to expose the polymerized contact lens for conveyance to the downstream hydration station. After the demold process, pusher assembly 210 pushes a series of pallets 12a on to a reciprocating transfer pallet apparatus 215 which conveys the pallets to a hydration assembly 89. At the hydration assembly, the front curve lens mold portions containing polymerized contact lens therein are simultaneously removed from their respective pallets and placed in an appropriate hydration chamber (not shown) so that each contact lens may be hydrated prior to packaging. The transfer apparatus subsequently returns the empty pallets back to conveyor 31f where a pusher assembly 222 transfers the empty first pallets back to conveyor 27 where they are transported to receive a new batch of front curve lens mold portions from injection mold assembly 20.

Figure 2A:
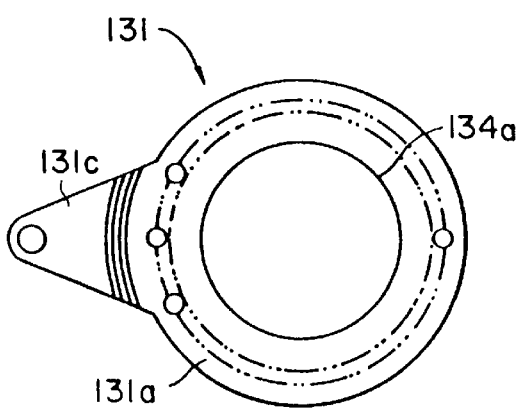
FIGS. 2(a) and 2(b) are respectively top and side cross-sectional views of one embodiment of a front curve (female) mold half of a contact lens mold assembly.
Figure 2B:
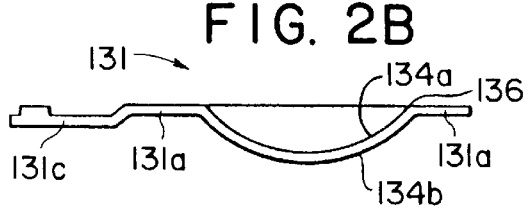

Referring to the drawings in detail, FIGS. 2(a) and 2(b) illustrate respective top plan and side views of an embodiment of a concave or front curve, mold half 131 useful in the production of a contact lens by the polymerization of a polymerizable composition in a mold assembly composed of two complementary front and back curve mold halves. The front mold half 131 is preferably formed of polystyrene but could be any suitable thermoplastic polymer which is transparent to visible and ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and having minimal shrinkage during cooling.

As shown in FIG. 2(a), the front mold half 131 defines a central curved section with an optical quality concave surface 134a, which has a circular circumferential parting edge 136 extending therearound. The parting edge 136, shown in FIG. 2(b), is desirable to form a well defined and uniform plastic radius parting line (edge) for the subsequently molded soft contact lens. A generally parallel convex surface 134b is spaced from the concave surface 134a, and an annular essentially uniplanar flange 131a is formed extending radially outwardly from the surfaces 134a,b in a plane normal (perpendicular) to the axis (of rotation) of the concave surface 134a. The concave surface 134a has the dimensions of the front curve (power curve) of a contact lens to be produced by the front mold half, and is sufficiently smooth such that the surface of a contact lens formed by polymerization of a polymerizable composition in contact with the surface is of optically acceptable quality. The front mold half is designed with a thinness (typically 0.8 mm) and rigidity effective to transmit heat therethrough rapidly and to withstand prying forces applied to separate the mold half from the mold assembly during de-molding. The flange 131a facilitates handling and positioning of the mold half as described in greater detail below. The front mold half 131 further defines a generally triangular tab 131c projecting from one side of the flange that is essentially uniplanar, lies in a plane parallel to the plane of flange 131a, and, is integral therewith.

Figure 3A:
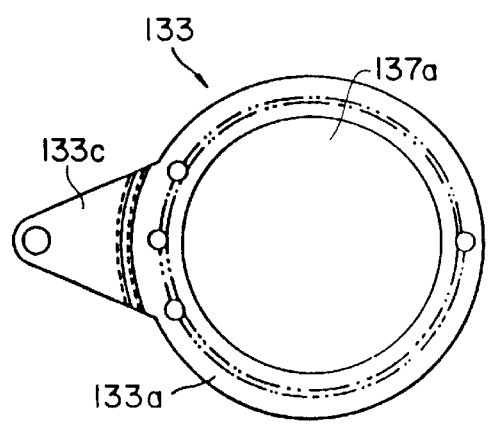
FIGS. 3(a) and 3(b) are respectively top and side cross-sectional views of one embodiment of a back curve (male) mold half of a contact lens mold assembly.
Figure 3B:
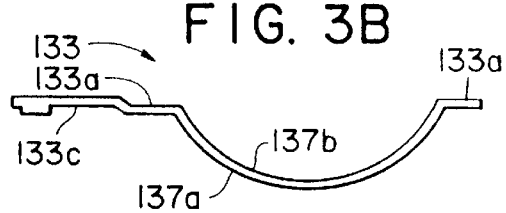

FIGS. 3(a) and 3(b) illustrate respectively top elevational and side views of one embodiment of a convex or back curve, mold half 133. The back curve mold half is designed with all of the same design considerations mentioned above with respect to the front mold half 131 as will be described in greater detail below. The back mold half 133 is also preferably formed of polystyrene but could be any suitable thermoplastic such as those mentioned hereinbelow which is transparent to visible and ultraviolet light. The back curve mold half 133 defines a central curved section with an optical quality convex surface 137a, a generally parallel concave surface 137b spaced from the convex surface 137a, and an annular essentially uniplanar flange 133a formed extending radially outwardly from the surfaces 137a and 137b in a plane normal to the axis (of rotation) of concave surface 137b to facilitate handling and positioning of the mold half. The convex surface 137a has the somewhat diminished dimensions of the rear curve (which rests upon the cornea of the eye) of a contact lens to be produced by the back mold half, and is sufficiently smooth such that the surface of a contact lens formed by polymerization of a polymerizable composition in contact with the surface is of optically acceptable quality. The back curve is designed with a sag of 5.6 mm and a thickness of 0.6 mm to result in a gap of 1.5 mm–3.0 mm (FIG. 5(b)) between an assembled back curve and front curve flange areas 133a, 130a, respectively, which allows mechanical means to remove the back curve mold halves from the front curve mold halves after polymerization. The back curve is thin enough to effectively transmit heat therethrough rapidly and thick enough to withstand prying forces applied to separate the mold half from the mold assembly during demolding.

Each of the front curve mold halves 131 and back curve mold halves 133 described above, are manufactured in respective injection mold assemblies 20 and 30 described generally above with reference to FIG. 1, and in further detail in co-pending U.S. patent application Ser. No. 08/257,785, now U.S. Pat. No. 5,540,410 entitled "Mold Halves and Molding Assembly for Making Contact Lenses" assigned to the same assignee as the instant invention, and, the disclosure of which is incorporated by reference herein. As described generally therein, the manufacture of the mold halves employs a heated mold (to ensure the flow rate does not decrease nor shear stresses increase) which introduces a molten mold material through a hot runner system to at least one (and preferably up to eight) mold cavity(ies). The mold material is a thermoplastic polymer such as polystyrene, polyvinyl chloride, polyethylene, polypropylene, copolymers of styrene with acrylnitrile and/or butadiene, acrylates such as poly methyl methacrylate, polyacrylonitrile, polyamides, polyesters, and the like. Polystyrene is preferred. Each mold cavity defines an optical quality curved surface and also a second noncritical curved surface for the mold half as described above.

Figure 4A:
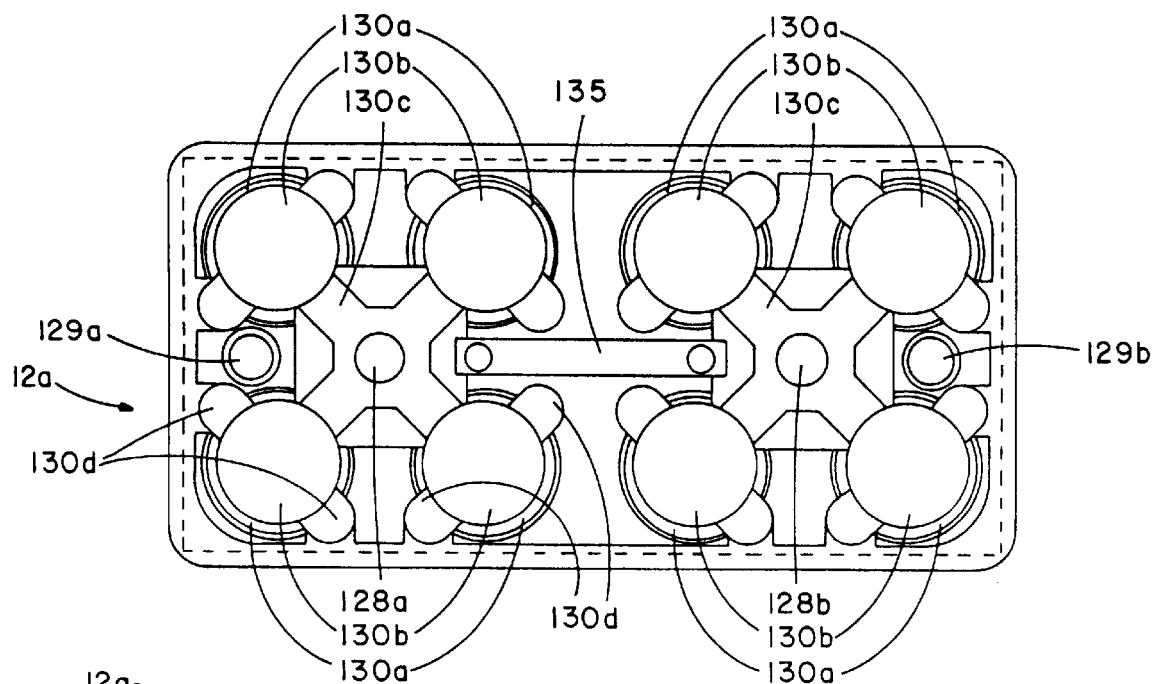
FIG. 4(a) is a top plan view of a production line pallet 12a (12b) of the present invention.

A top view of a production line pallet 12a for carrying production lens mold halves is shown illustrated in FIG. 4(a). It should be understood that pallets 12a,b are interchangeable in that they may accommodate either front curve or back curve contact lens mold halves. In the preferred embodiment shown in FIG. 4(a), the production line pallet 12a is formed of aluminum and may be up to 60 mm in width and 120 mm in length. In another embodiment, the pallet 12a may be formed of stainless steel and may be 80 mm in width and 160 mm in length.

As shown in FIG. 4(a), each pallet 12a contains a plurality of recesses 130b for receiving front curve mold halves, back curve mold halves, or, contact lens mold assemblies 139 each comprising a complimentary pair of front 131 and back 133 curve mold halves which define the shape of the final desired lens. One such mold assembly 139 is shown seated within a recess 130b of the pallet in FIG. 5(b). The depth of each recess 130b is greater than the 5.6 mm sag of a back curve lens mold and is sufficient to ensure that the convex optical quality surface of a back curve lens mold half seated within the recess does not come into contact with the concave surface of the pallet recess. The contact lenses are formed by placing an amount of polymerizable composition, generally on the order of about 60 µliters (microliters) in each front curve (concave) mold half 131 seated within a pallet recess 130b at the filling/mold assembly apparatus 50. The desired amount depends on the dimensions (i.e., the diameter and thickness) of the desired lens, and the cavity formed between the front curve and back curve mold portions. Then, the back curve (convex) mold half 133 is placed onto the polymerizable composition 132 with the first and second mold halves aligned so that their axes of rotation are collinear and the respective flanges 131a, 133a are parallel.

The mold halves 131,133 are carries in an annular recess 130a which receives and supports the annular flange 131a of the front curve mold half and the annular flange 133a of the back curve mold half. As shown in FIG. 5(b), the depth of the annular recesses 130a is sufficient to ensure that the annular flange portion 131a of lens mold half 131 preferably lies planar with, or, slightly below, the pallet surface so that the mold halves do not protrude above the pallet surface when seated in the recesses. This enables mechanical pry fingers of the de-mold assembly 90 to unobtrusively enter the 1.5 mm–3.0 mm gap created between the annular flange portions 131a, 133a of each mold half of the mold assembly 139, as will be discussed in further detail below, and further enables a bottom set of pry fingers to restrain each front curve lens mold half of the mold assembly against the pallet surface during removal of the back curve mold halves at the de-molding station. Additionally, the annular recesses 130a are provided below the pallet surface so that a quality control laser scanner (not shown) scanning the pallet surface may easily detect any skewed lens mold half that protrudes above the pallet surface. In addition to the recesses 130a and 130b, the pallets 12a,b also have a plurality of oriented recesses 130c which receive the triangular tab portion 131c, 133c of the seated front curve mold half 131 or back curve mold half 133, respectively, to provide a predefined angular position thereof. The recesses 130c are designed to prevent movement of the normally seated mold half within each recess up to within +/–0.1 mm. The triangular tab 133c of the second or back curve mold half 133 overlies front curve tab 131c to provide a collinear axis of rotation with respect to the two mold halves.

As shown in FIG. 4(a), recesses 130d are additionally provided in the pallet surface for accommodating clips (not shown) that are inserted at the hydration station 89 for removing the front curve mold halves from the pallets 12a as discussed in further detail in co-pending patent application U.S. Ser. No. 08/258,566, now U.S. Pat. No. 5,476,111 entitled "Automated Method and Apparatus for Hydrating Soft Contact Lenses" assigned to the same assignee as the instant invention.

Figure 4B:
FIGS. 4(b) and 4(c) are respective side and bottom views of the production line pallet 12a (or 12b) of FIG. 4(a).
Figure 4C:
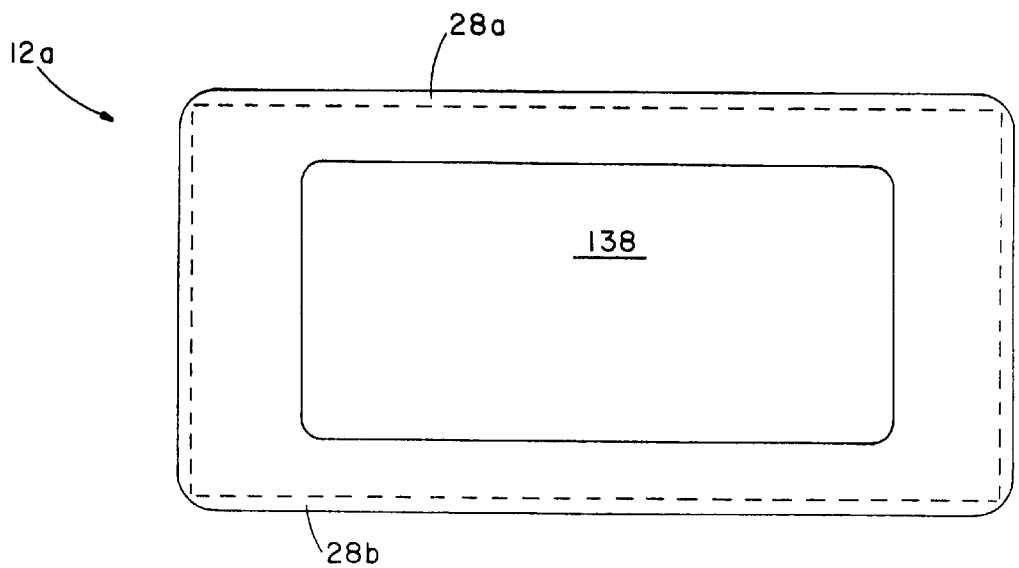

As illustrated in FIGS. 4(a)–4(c), pallet 12a of the present invention is designed to ensure that a tight vacuum seal may be created with the surface of the pallet during the monomer deposition and contact lens mold assembly phases of the production line facility. As will be explained in further detail below, blind locating bushings 129a and 129b are located at opposite ends of the pallet 12a to enable precise positioning of the pallet within the various assemblies of the production plant. These locating bushings enable a precise registration of the pallet throughout the various assemblies of the contact lens production facility, and, thereby assist in the alignment of a tight vacuum seal to be created at the peripheral outer surface 140 of the pallet during the deposition of polymerizable monomer in the concave portion of the front lens mold half prior to assembling the final mold assembly. As shown in FIG. 4(a), proximate the center of each pallet 12a is a unique bar code identifier 135 for handling, tracking, and quality control purposes as explained in greater detail in co-pending patent application U.S. Ser. No. 08/247,790, now U.S. Pat. No. 5,555,504 entitled "Production Line Tracking and Quality Control System" assigned to the same assignee as the instant invention.

As further shown in FIGS. 4(b) and 4(c), the outer peripheral edges of the pallet 12a define a groove or indentation 28a,b for engaging a complementary guide rail or shoulder for enabling precise registration of the pallet at the demolding apparatus, as will be explained below in greater detail below. Additionally, the grooves 28a,b engage a means (not shown) at the monomer dosing (filling) and mold assembly stations to prevent lifting of the pallet by a residual vacuum when the vacuum that is created on the pallet is removed. Each pallet 12a(,12b) includes blind holes 128a and 128b wherein a viewing device, such as a bore scope, may be inserted to enable real time viewing of the contact lens production process at the surface of the pallet.

Figure 7A:
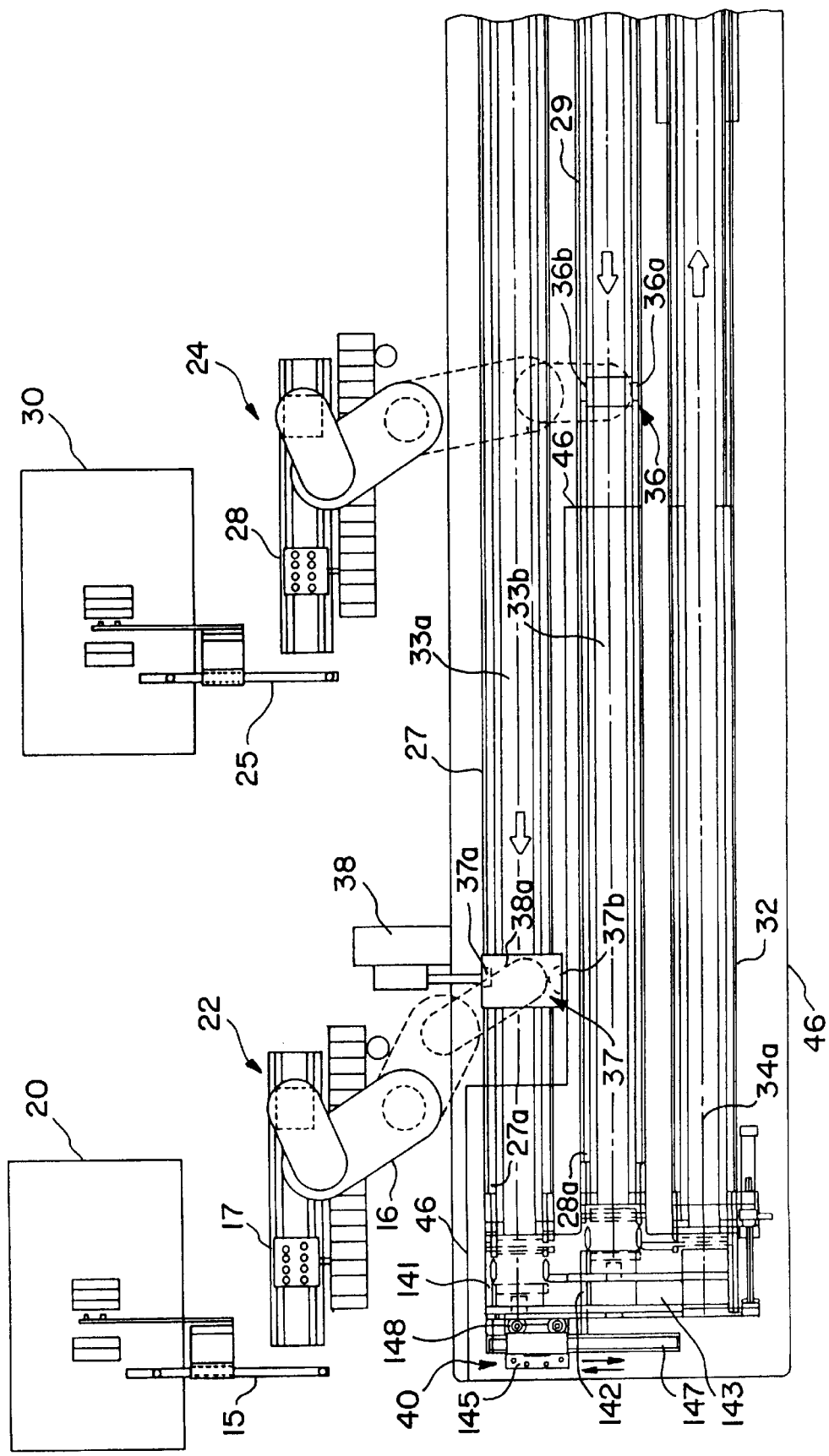
FIG. 7(a) illustrates in detail apparatuses 22 and 24 for transporting respective front curve and back curve mold halves from their respective injection mold assemblies to their respective pallets temporarily halted on conveyors 27,29 respectively.

FIG. 7(a) illustrates in detail apparatuses 22 and 24 for transporting respective front curve and back curve mold portions from respective injection mold assemblies 20 and 30 to respective pallets 12a and 12b. A detailed description of each injection mold assembly 20 and 30 may be found in the aforementioned co-pending patent application U.S. Ser. No. 08/257,802 entitled "Low Oxygen Molding of Soft Contact Lenses" assigned to the same assignee as the instant invention. A detailed description of each transporting assembly 22 and 24 may be found in co-pending patent application U.S. Ser. No. 08/258,267 entitled "Apparatus for Removing and Transporting Articles from Molds" assigned to the same assignee as the instant invention.

Generally, robotic apparatus 22 is provided with a first robotic assembly 15 for removing front curve lens mold articles from injection mold assembly 20, and transporting the articles to a first location; assembly 17 is provided for receiving the front curve lens mold articles from assembly 15 and transporting the articles from the first location to a second location, and robotic assembly 16 is provided for receiving the front curve lens mold articles from assembly 17 and transporting those articles from the second location to an inverting head 38a of inverting device 38 that inverts the orientation of the front curve mold portions carried by the robot 16. This inversion is necessary because the robotic assembly 16 is handling the front curve mold portions at their non-optical (convex) side and the front curve mold portions must therefore be inverted to enable the non-optical surface of each mold to be placed in the pallet 12a that has been momentarily paused to receive the front curve lens mold articles from assembly 22.

Each of the pallets is momentarily paused on conveyor belts 27, 29 at the time of transfer of the mold assembly. In the preferred embodiment shown in FIG. 6 and 7(a), a clamping mechanism 37 comprising a pair of clamping jaws 37a,b (shown as phantom lines) are located at opposite sides of the conveyor 27 to timely clamp an empty pallet 12a and halt its motion so that the front curve mold halves may be positioned on the pallet by inverting head 38a.

In the preferred embodiment, apparatus 30 shown in FIG. 1 is also provided with a first assembly 25 for removing back curve lens mold articles therefrom and transporting the articles to a first location; assembly 28 is provided for receiving the back curve lens mold articles from assembly 25 and transporting the articles from the first location to a second location, and robot assembly 26 is provided for receiving the back curve lens mold articles from assembly 28 and transporting those articles from the second location to a predetermined location along a back curve supply conveyor 29 carrying a back curve lens pallet 12b that has been momentarily paused to receive the back curve lens mold articles from assembly 24. In the preferred embodiment shown in FIGS. 6 and 7, a clamping mechanism 36 comprising a pair of clamping jaws 36a,b are located to timely clamp an empty pallet 12b to halt its motion on conveyor 29 while the back curve mold halves are positioned on the pallet by robot assembly 26. It should be mentioned that the process of positioning front and back curve mold portions from their respective injection mold assemblies occurs in a low oxygen, and preferably, a nitrogen environment. Additionally, infeed conveyors 32, front curve 27 and back curve 29 conveyors transports the pallets 12a and molds in a low oxygen environment, which environment is accomplished by enclosing each conveyor in an atmosphere of pressurized nitrogen gas. As will be explained below, the handling of the pallets and the contact lens mold assemblies throughout the various stations of the production line facility are in nitrogen gas to provide a low oxygen environment for all of the component parts prior to polymerization.

The operation of the preferred embodiment of clamping mechanism 37 (and 36) will now be described in view of FIG. 6. It should be mentioned that the operation of all clamping mechanisms hereinafter disclosed, is essentially the same as the following description of the preferred embodiment. Specifically, the clamping mechanism 37 consists of one or more pneumatic cylinders 39 that operates to push lower ends 44a,b of clamping jaws 37a,b so the jaws pivot about associated clamping shafts 42a,b to close in and enable respective fixed clamping blocks 37c,d to grip pallet 12a (shown in phantom lines in FIG. 6) that is positioned in alignment with the jaws 37a,b. As illustrated in the FIG. 6, the clamping blocks 37c,d of clamping jaws 37a,b are located just above and at opposite sides of the conveyor 27 while the pneumatic cylinder 39 is mounted below the conveyor 27.

To transport the pallets, each supply conveyor 27,29 comprises a drive means in the form of a motor driven belts 33a,33b, respectively, which are strong enough to support pallets 12a,b supplied to the sequencing apparatus 40. As illustrated in FIG. 4(b), a raised underside section 138 of each pallet 12a,b may be coated with a suitable lubricant or low-friction coating so to enable sliding of the pallet when being held above a moving belt by clamping jaws 36,37 or pushed along slide plates at certain processing locations of the plant.

As shown in FIG. 7(b) sequencing pallet conveyor 32 comprises a drive means 34b in the form of a motor driven belt 34a which is strong enough to transport thirty or more paired sets of pallets 12a,12b to the various filling/mold assembly apparatuses 50. The motor drive means 34b shown in FIG. 7(b), enables the paired sets of pallets carrying respective front and back curve lens mold portions to be smoothly and uniformly transported at a preferred rate of approximately 40 mm/sec (±10 mm/sec) until they are assembled for processing at the filling/mold assembly apparatus 50 explained in detail below. Idler rollers 34c and tensioner roller 34d are provided as shown in FIG. 7(b) for adjusting the tension of the drive belt 34a, if necessary. In a similar fashion, as shown in FIGS. 7(c) and 7(d), suitable motor drive means 33c,33d, drive respective conveyor belts 33a,33b carrying the respective pallets 12a,12b so that they are smoothly and uniformly transported at a preferred rate of approximately 85 mm/sec (±10 mm/sec) until their motion is terminated at the ends of each conveyor for sequencing as will be explained in further detail below. Additionally, idler rollers 33e and tensioner roller 33f are provided as shown in FIG. 7(c) for adjusting the tension of the drive belt 33b of conveyor 29. Similarly, idler rollers 33g and tensioner roller 33h are provided as shown in FIG. 7(d) for adjusting the tension of the drive belt 33a of conveyor 29.

FIG. 5(a) illustrates a cross-sectional, front view of a conveyor assembly 27 shown carrying a pallet 12a on conveyor belt 33a. It is understood that the view of FIG. 5(a) may apply to any of the other above-described conveyors 29 and 32 carrying pallets.

FIGS. 7(a) and 8(a)–8(c) illustrate in detail the sequencing apparatus 40 of pallet system 10 comprising a double cross pusher which positions a pallet 12a from conveyor 27 (containing front curve contact lens mold portions) next to a pallet 12b from supply conveyor 29 (containing) back curve contact lens mold portions) for conveyance along the sequencing conveyor 32. The double cross pusher 40 is located at the respective ends 27a,29a of each supply conveyor 27, 29 and comprises a first arm 141 and second arm 142 for simultaneously pushing pallets from respective supply conveyors 27 and 29 along track 143 for entry into the main sequencing conveyor 32. As illustrated in FIG. 7(a), the first arm 141 and second arm 142 are mounted in parallel on mounting means 145 that is slidable along track 147 in both directions as indicated by the double arrows in FIG. 7(a). A lifting means 148, which may be pneumatically operated, is provided for raising and lowering the first and second arms 141,142 in a vertical direction above the plane of a horizontally positioned pallet, as will be explained in further detail below. While the arms 141,142 are in a raised position, the mounting means 145 remains slidable along track 147 so that the first and second arms may be retracted while in their raised position and subsequently lowered after reaching their original positions.

Figure 8A:
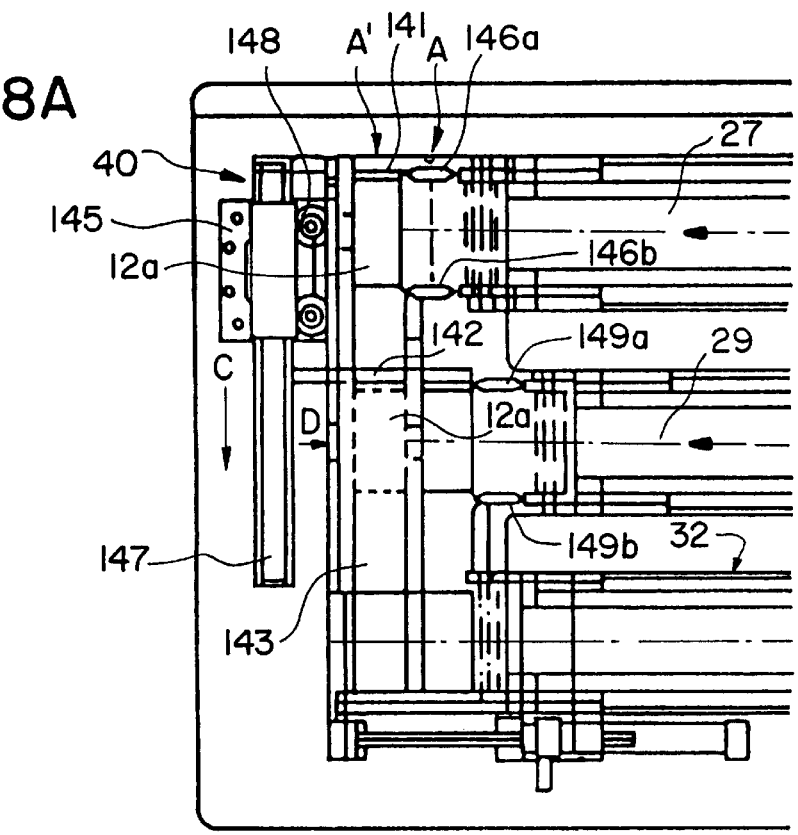
FIGS. 8(a)–8(c) illustrate the sequencing apparatus 40 for positioning a pallet 12a containing front curves adjacent a pallet 12b containing back curves for interleaved conveyance on sequencing conveyor 32.

In a first step of the sequencing process, the forward motion of a pallet 12a from conveyor 27 is terminated at a first position "A", just forward of the first arm 141, as shown in FIG. 8(a). Forward motion of the pallet 12a is terminated by a pair of upstream clamping jaws 146,a,b, that, in a timed fashion, open and close to let one pallet align with the first pusher arm 141 of the double pusher. When jaws 146a,b are closed, forward motion of the pallet is terminated and a plurality of pallets will accumulate behind the clamped pallet. At the appropriate time, one pallet may be released by opening the clamping jaws 146a,b so that the forward motion of the accumulating pallets on conveyor 27 will push the first lead pallet to a second position indicated as "A'" in FIG. 8(a), in alignment with the first pusher arm 141. The jaws 146a,b may be immediately closed to clamp the next of the accumulated pallets to prevent its forward motion. The opening and closing of the clamping jaws 146a,b may be appropriately timed to enable pallets to be sequentially input to the pusher in an orderly fashion.

After appropriate sensing, and, as controlled by a computer or a programmable logic controller, the arms 141,142 of double cross pusher 40 are caused to slide along track 147 in the direction indicated by arrow "C" in FIG. 8(a) so that first arm 141 pushes pallet 12a to a second position that is located just forward of second arm 142 position and indicated by arrow "D" in FIG. 8(a). It is understood that during any initialization of the sequencer, the second arm 142 did not push any pallet since none were positioned for movement in front of second arm. The lifting means is then commanded to raise the first and second arms 141,142 so that the mounting means and the arms may be retracted along track 147 and subsequently lowered back at their original position as shown in FIG. 8(a).

Figure 8B:
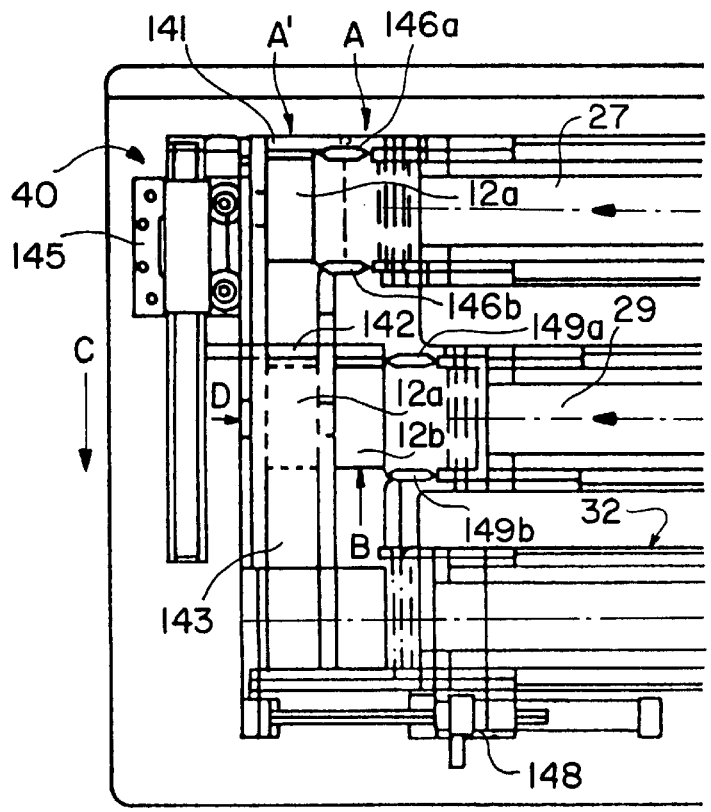
Figure 8C:
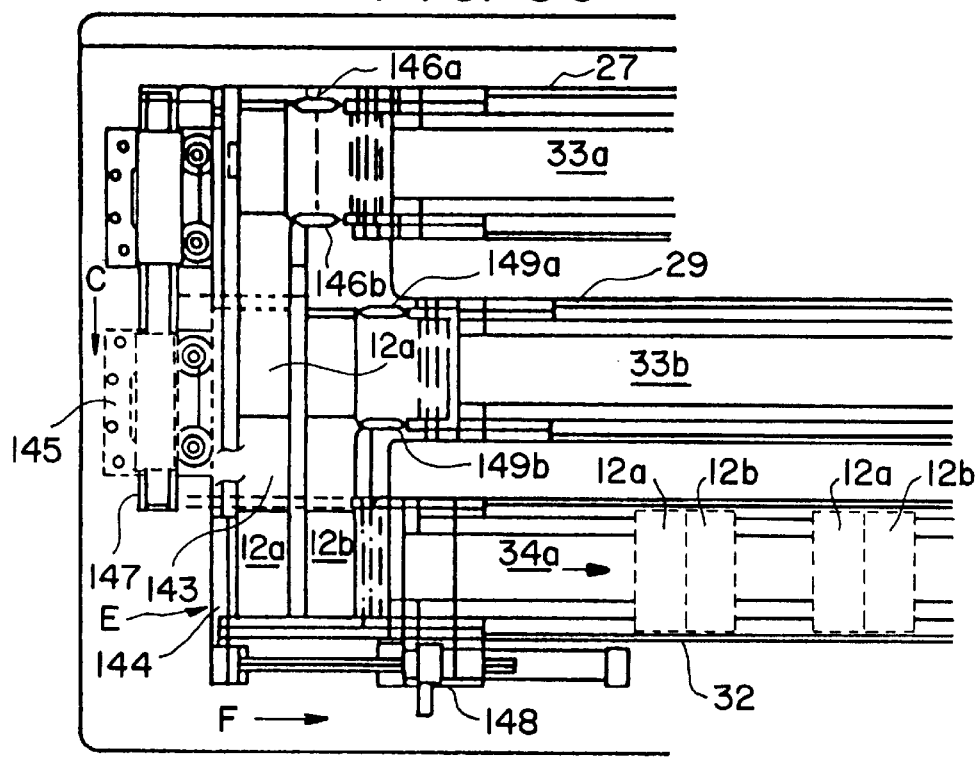

The description hereinbelow demarcates where steady state sequencing operations begin. As shown in FIG. 8(b), after retracting first and second arms 141,142 to their original position, or, preferably, while the arms are in their raised position while being retracted, a new pallet 12a carrying front curve lens mold portions from conveyor 27 is positioned at the vacated first position (indicated by arrow A') in the manner described above. Simultaneously therewith, the forward motion of a pallet 12b carrying back curve contact lens mold portions from back curve supply conveyor 29 is terminated at a position "B" as indicated in FIG. 8(b). The process for aligning a pallet 12b carrying back curve lens mold portions at position B is essentially similar as described above with respect to pallet 12a. In a timed manner, clamping jaws 149a,b close to clamp pallet 12b, while the other pallets on conveyor 29 accumulate behind the clamped pallet. The jaws 149a,b are subsequently opened to release the pallet so that the motion of the conveyor 29 bushes the pallet 12b in alignment with the second pusher arm 142. The jaws 149a,b are immediately closed to clamp the next of the accumulated pallets to prevent its forward motion. It is readily observed in FIG. 8(b) that a pallet 12b carrying back curve contact lens mold portions is now positioned immediately adjacent the previously positioned pallet 12a from the initial step and are both situated at position "D" in alignment with the second arm 142. After appropriate sensing, the arms 141,142 of the double cross pusher 40 are again caused to slide along track 147 from their original position in the direction indicated by arrow "C" so that first arm 141 pushes a pallet 12a to the second position (arrow "D") and the second arm 142 pushes the pair of pallets 12a,12b from second position "D" (FIG. 8(b)) to a third position indicated by arrow "E" in FIG. 8(c). Mounting means 145 and first and second pusher arms 141,142 are represented as phantom lines as shown in FIG. 8(c) in their fully extended position on track 147. Finally, the pusher arms 141,142 are raised so that the mounting means 145 and the arms may be retracted along track 147 and lowered at their original position as shown in FIG. 7. While the first and second arms 141,142 are being retracted, a new set of pallets are being loaded at their respective positions. Specifically, a pallet 12a is loaded at position indicated as A' (FIG. 8(b)) and a pallet 12b is loaded at position indicated as B adjacent the previously positioned pallet 12a and the sequence is repeated.

While the new set of pallets are being loaded at their respective positions, a third pusher arm 144 operable by pneumatic driving means 148 is activated to push the adjacently situated pair of pallets 12a,12b in the direction indicated by arrow "F" in FIG. 8(c), for engagement with the drive belt 34a of conveyor 32. In steady state operation, the sequence of events described above is repeated so that pairs of pallets 12a,12b are sequentially transported along conveyor 32 to the filling and mold assembly stations of the contact lens production facility, as shown by the phantom lines travelling in the direction of arrow "F" in FIGS. 1 and 8(c). The paired sets of pallets 12a,12b carrying respective front curve and back curve lens molds reach a second sequencing apparatus 55 where their forward motion is diverted for input to the filling apparatus 50.

Figure 9:
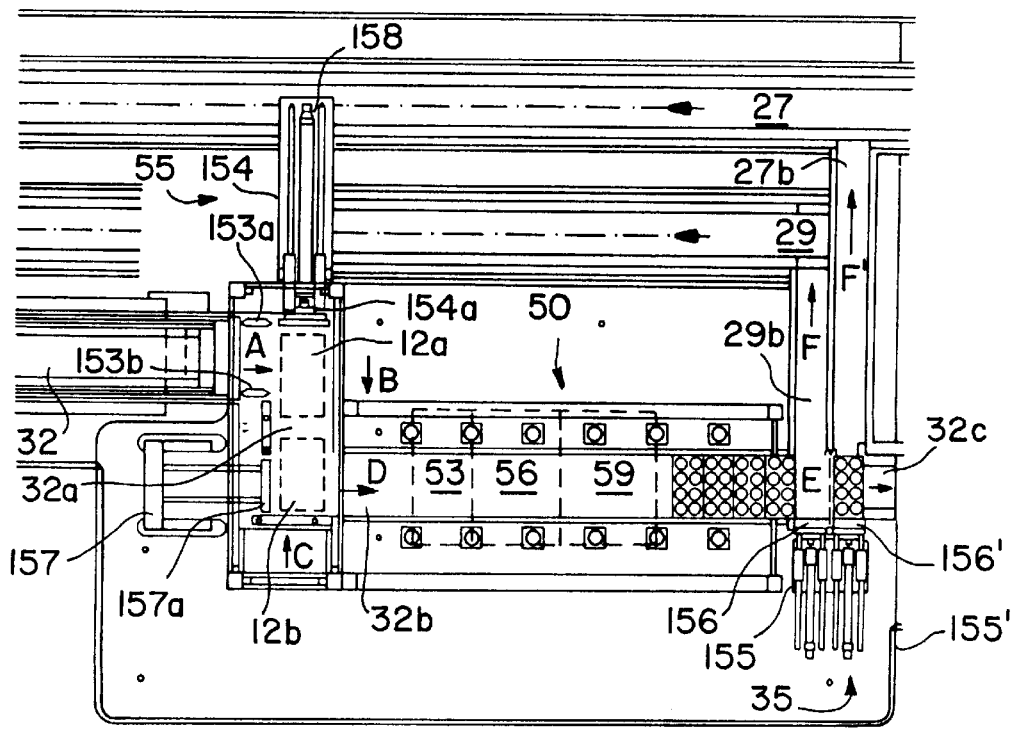
FIG. 9 illustrates the apparatus 55 for transferring pallets from conveyor 32 to the filling/mold assembly apparatus 50.

FIG. 9, which is a continuation of FIG. 7(a), illustrates the precision pallet handling apparatus 55 for transferring pallets from conveyor 32 to the filling apparatus 50. Specifically, the motion of each pallet 12a,b carrying respective lens mold halves is terminated by a pair of upstream clamping jaws 153a and 153b, in the manner as described above, at position indicated as "A" in front of pusher 154a of ram 154. When the motion of the first pallet is halted, the alternating series of pallets 12a,b accumulate therebehind. The jaws 153a,b are opened to enable one pallet, for e.g., pallet 12b carrying back curve lens mold halves, to align with pusher 154a of ram 154. Then, ram 154 which in the preferred embodiment is driven by pneumatic cylinder unit 158, is timely activated to push the pallet 12b along slide plate 32a for a distance equivalent to the length of the pallet in the direction indicated by arrow "B", to a position in alignment with ram head 157a of ram 157 indicated as position "C" in FIG. 9. The ram 157, which is also pneumatically driven by suitable means (not shown), is timely activated to push the pallet 12b along track 32b in the direction indicated by arrow "D" for a distance approximately equal to the width of the pallet ±0.1 mm. The sequence of events herein described is continuously repeated to enable precision registration of pallets 12b and 12a to alternately enter filling and dosing apparatus 53 of filling/mold assembly station 50.

Figure 10:
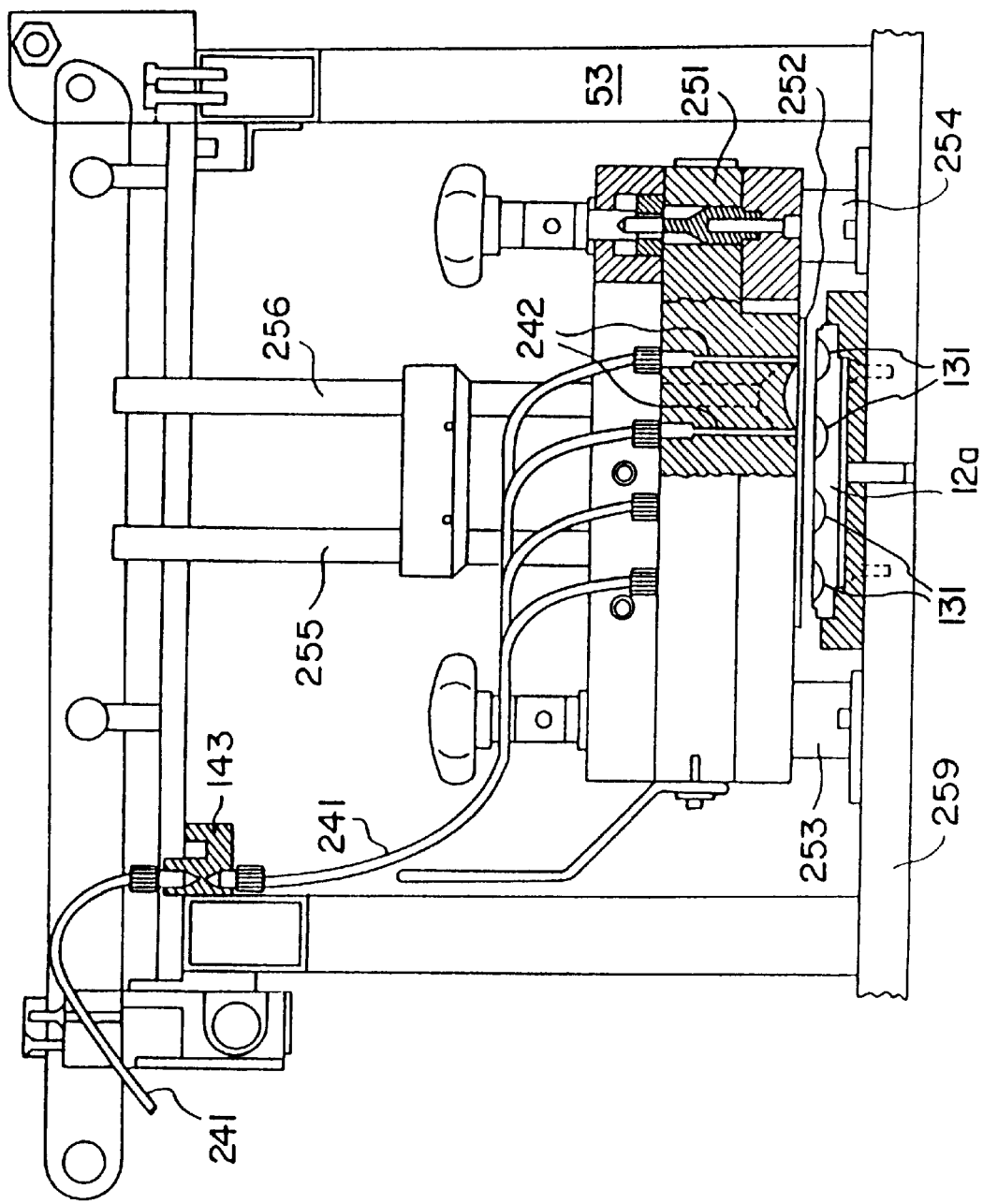
FIG. 10 is a partially cross-sectional side view of the filling station used for depositing a predetermined amount of monomer in each of the mold cavities.

As described briefly above and in further view of FIGS. 10 and 12(a), a predetermined amount of the polymerizable monomer or monomer mixture is deposited in a front curve mold half by means of a precision dosing nozzle 242, which is part of the dosing or filling apparatus 53 of station 50. The monomer may be dosed in each of the front curve mold halves, carried in the alternating pallets, under vacuum to avoid the possibility of entrapping any gasses between the monomer and the front curve mold half. As described in further detail in co-pending patent application U.S. Ser. No. 08/258,264 entitled "Method and Apparatus for Contact Lens Mold Filling and Assembly", assigned to the same assignee as the instant invention and the disclosure of which is incorporated by reference herein, the polymerizable monomer mixture is first degassed to insure that significant dissolved gasses are not present in the monomer inasmuch as dissolved gasses may well form bubbles as the monomer is released from the relatively high pressure of the dosing nozzle 242 to inert atmospheric $N_2$ or vacuum conditions surrounding the front curve mold half 131. Additionally the oxygen content of the monomer solution is monitored prior to discharge i the front curve mold cavities.

In the preferred embodiment of the invention, approximately 60 μl (microliters) of polymerizable monomer or monomer mixture is deposited in the front curve mold half to insure that the mold cavity is overdosed, and to avoid the possibility of incomplete molding. The excess monomer is removed from the mold cavity in the final step of the assembly of the front and back curve mold halves as will be hereinafter described.

Figure 11:
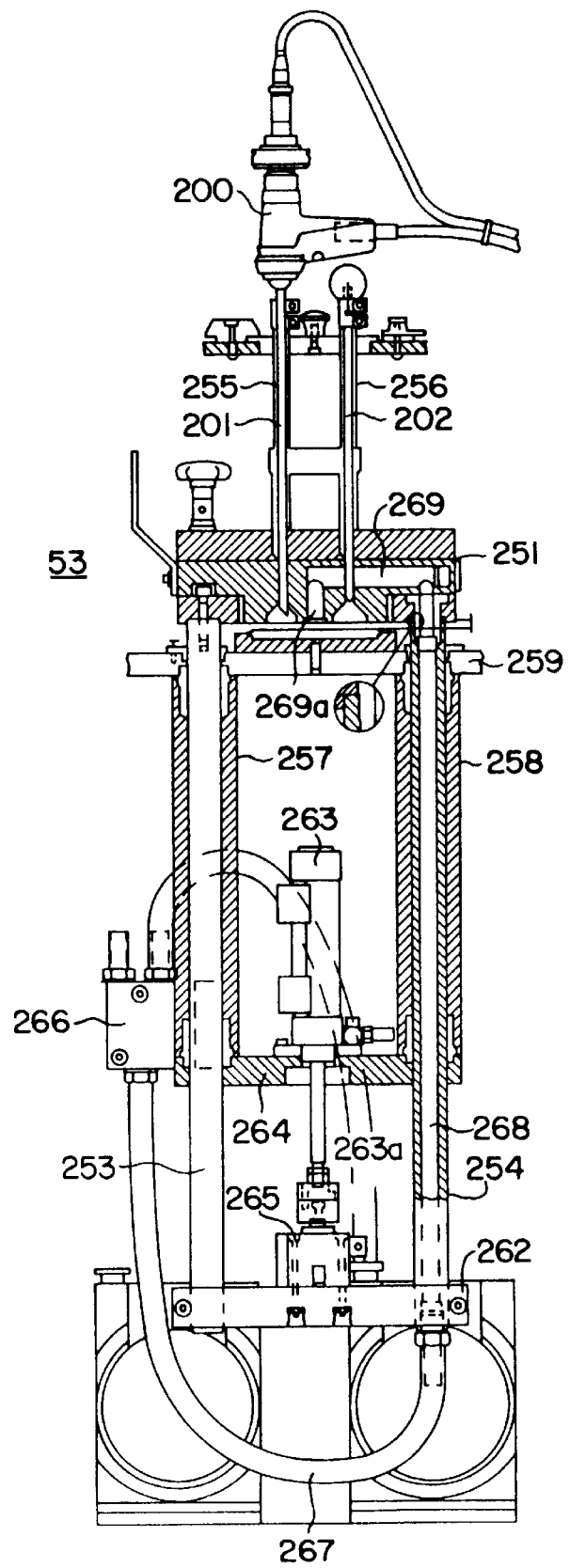
FIG. 11 is a diagrammatic and partially cross-sectioned illustration of the dosing or filling station 53 illustrating the vacuum interconnections to the reciprocating filling module.

The filling or dosing station 53 will now be described with respect to FIGS. 10 and 11, wherein FIGS. 10 and 11 are partially cross-sectioned views of station 53. As previously mentioned, the monomer is first substantially degassed to avoid the formation of gas bubbles in the dosed monomer, at either the time of dosing or the time of mold assembly, inasmuch as the bubble will induce cavitation of the monomer during polymerization thereby rendering the lens defective and unusable.

At the station 53, a plurality of monomer supply lines 241 are coupled to an associated discharge nozzle 242, two of which are illustrated in FIG. 10 which are suspended directly over the path of the pallet 12a and the individual front curve molds 131. The dosing station 53 includes a manifold block 251 for receiving each of the monomer discharge nozzles 242 and a vacuum seal 252 which may be used to cooperate with the outer perimeter 140 of pallet 12a to provide a sealed enclosure that may be evacuated with a vacuum pump so that the deposition of the monomer occurs in a vacuum. The manifold block assembly 251 reciprocates with respect to a fixed platform 259 on a pair of tubes or cylinders 253, 254 as will be hereinafter described with respect to FIG. 11. The dosing module 53 also includes a pair of bore scope tubes 255, 256 which enable inspection of the monomer dosing, if desired, through a bore scope 200.

As illustrated in FIG. 11, the entire deposition module 53 is reciprocated vertically with respect to a fixed support frame 259 and 264 by means of a short stroke pneumatic cylinder 263 mounted on movable frame 262 and the fixed frame 264 by drive rod 263a of pneumatic cylinder 263. Vacuum is supplied through the filling or dosing station through manifold 266 and vacuum line 267 to an interior manifold 268 formed in one of the two tubes 253,254. The tubes or cylinders 253,254 reciprocate with fixed guide tubes 257,258. A vacuum plenum is also formed in the manifold block 251 by means of bore holes 269 or 269(a) which provide vacuum communication between the vacuum manifold 266 and the interior of the dosing station 53 defined by perimeter seal 252 and the pallet 12a.

A bore scope 200 is illustrated in FIG. 11 with an optic probe 201 extending down into the blind holes 128a,b of pallet 12a and manifold block 251. A dummy or blind 202 is installed in the other bore scope tube 256 to seal access into the interior vacuum plenum of the assembly station 53 when a bore scope is not in use.

In operation, a pallet 12a is advanced into the dosing station 53 by means of the material handling ram 157 previously discussed with respect to FIG. 9. Once in position, the manifold assembly 251 is reciprocated downwardly by means of pneumatic cylinder 263. As the vacuum seal 252 on the manifold assembly 251 engages the pallet 12a, the sensor assembly 265 may be triggered, thereby opening a valve to draw a vacuum in manifold 266, vacuum line 267, manifold 268 and plenum 269, 269(a). It should be noted that a vacuum is not required for filling or dosing of the mold cavities, but does avoid the possibility of $N_2$ gas being trapped between the monomer and the front curve mold half. It should also be noted that the ambient atmosphere surrounding pallet 12a is a low oxygen $N_2$ environment and evacuation of the chamber is an evacuation of the $N_2$ gas. After vacuum has been established within the dosing chamber, pumps (not shown) are actuated to deliver a precise dose of 60 $\mu$l to each of the mold cavities 131 illustrated in FIG. 10.

After the monomer has been dosed into the individual mold cavities, the vacuum is broken in manifold 266 and the manifold assembly 251 is reciprocated upwardly by pneumatic drive means 263 to allow transport of the pallet 12a to the apparatus 56 which coats the mold flange with a mold release surfactant.

The second apparatus in the station 50 for depositing and assembling the mold parts is a stamping station 56 illustrated in FIG. 12(b), and more fully described in U.S. Ser. No. 08/250,263, now U.S. Pat. No. 5,542,978, entitled "Method and Apparatus for Applying a Surfactant to Mold Surfaces", also assigned to the assignee of the present invention, and, the disclosure of which is incorporated by reference herein. In operation, the annular flange 131a surrounding each front curve mold half of a pallet 12a is stamped via stamp pad 221 with a thin film of surfactant which has been found useful in removing the excess cured monomer displaced form the mold cavity at the time of assembly. The excess monomer 132 (when hydroxyethylmethacrylate is used, it is referred to as "HEMA") is displaced between the flanges 131a and 133a, as illustrated in FIG. 12(d) to form a ring 132a of excess HEMA at the time of mold assembly. This "HEMA ring" is also cured contemporaneously with the polymerizable monomer or monomer mixture that forms the contact lens 132.

By stamping the front curve mold flange 131a with a surfactant, the excess HEMA ring 132a preferentially adheres to the back curve mold half flange 133a and is removed from the production line at the time the back curve mold half is removed at mold disassembly. In the preferred embodiment, the mold release surfactant is a polyethylene oxide sorbitan mono-oleate, commercially sold under the trade name "Tween 80".

The stamping head station 56 includes mounted therein a plurality of stamps 221 each adapted to be moved in vertical reciprocatory movement in a coordinated matter by pistons 222 mounted in the stamping head station 56, wherein the number of stamps 221 is correlated with the number of front curves 131 carried by pallet 12a. Each stamp 221 is made of rubber, preferably a silicon/urethane mixture.

Adapted to be positioned in spaced relationship below the lower end of each stamp 221 when the stamp is in a raised position, is a horizontally shiftable pad member (not shown) which is constituted of a suitable porous material, such as porous polyethylene having an average 10 micron pore size, and which is impregnated with a solution containing a surfactant, the latter of which may be present in a highly concentrated state. The upper surface of the pad member is covered by a filter, preferably of nylon, having a mesh size of 1.2 microns so as to act as a metering device and allow only relatively small quantity of surfactant to pass therethrough as the surfactant is wicked form the bottom of the pad member to the top upon the pad member being pressingly contacted by the bottom ends of the stamping heads 221.

As mentioned above, the complimentary pair of front 131 and back 133 curve mold halves which define the shape of the final desired lens are used to direct mold the monomer mixture as shown in FIG. 5(b). After the dosing and stamping step i the filling apparatus 50, in which the front concave mold half 131 is partially filled with a polymerization mixture 132, the concave front mold half 131 is covered with the back curve mold half 133 under a vacuum to ensure that no air bubbles are trapped between the mold halves. The back curve mold half is then brought to rest on the circumferential edge 131c of the concave front mold half to ensure that the resultant lenses are properly aligned and without distortion. The provision of tabs 131c and 133c extending from respective sides of each front and back curve mold halves are preferably positioned one over the other as shown in FIG. 5(b) during the mold assembly, to facilitate handling thereof.

Figure 13A:
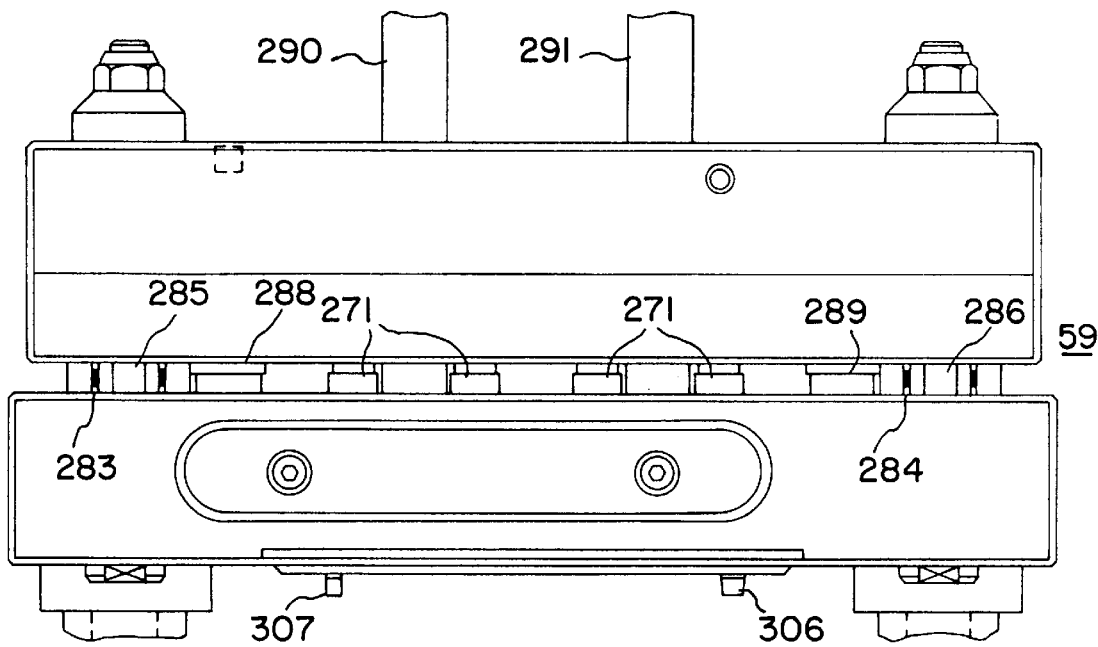
FIG. 13(a) is a diagrammatic side view of the exterior of the mold assembly module 59 of the filling/assembly station 50.
Figure 13B:
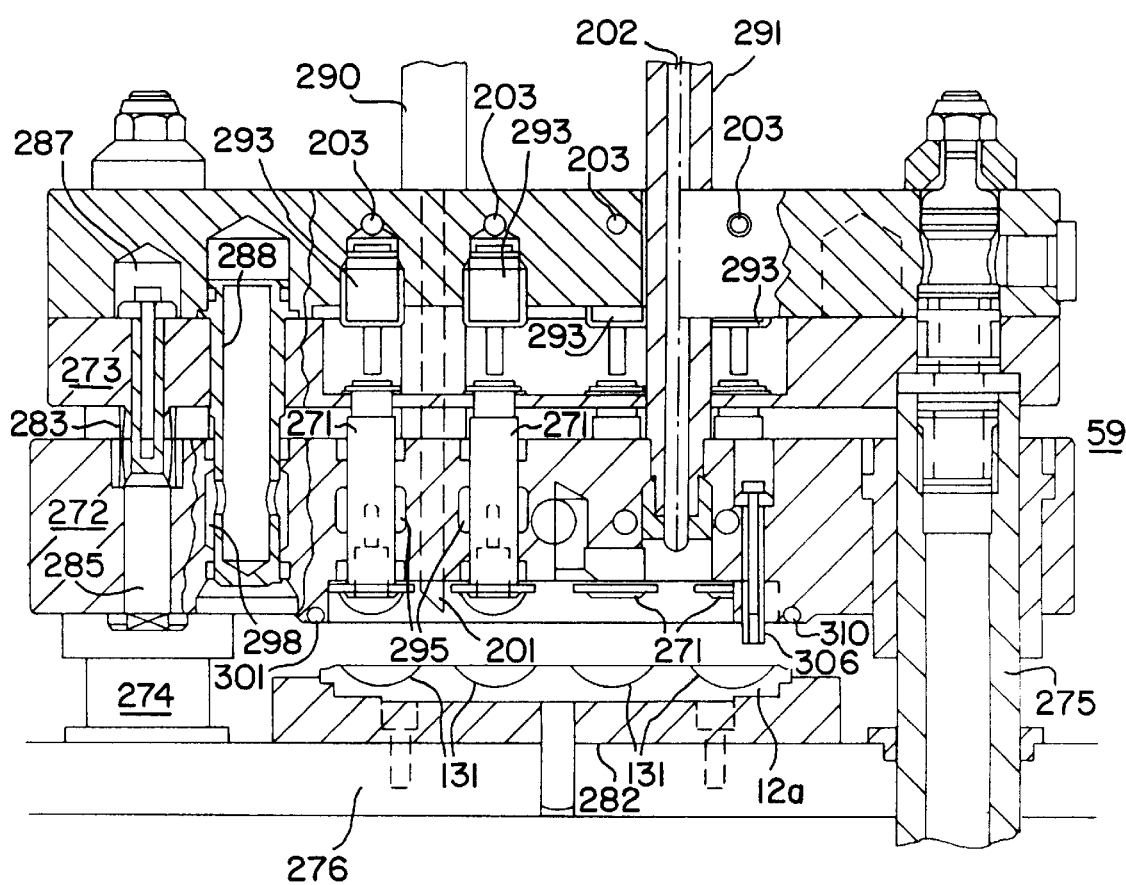
FIG. 13(b) is a partially cross-sectioned side view of the assembly module illustrated in FIG. 13(a).

The operation of the assembly station of the present invention will be explained with reference to FIGS. 12(c), 12(d), 13(a) and 14 wherein FIG. 13(a) represents an external elevation view of the assembly module 59 and FIG. 13(b) represents a partially cross-sectioned view of the assembly module 59 that is sectioned along two separate axes from section line A–A' for the purposes of illustration. The assembly station 59 includes 4 reciprocal pistons 271, two of which are illustrated in the left section of A–A' of FIG. 13(b) with back curves attached thereto and two of which are partially visible in the right hand section of A–A' of FIG. 13(b) without back curves. It should be understood that in the preferred embodiment eight reciprocating pistons are used to remove eight (8) back curve mold halves from each of the eight locations on pallet 12b for placement upon corresponding front curve lens mold halves. The reciprocating pistons 271 are mounted for reciprocation within the vacuum housing 272 and are both carried by and may float within the primary housing 273. Each of the three members 271, 272 and 273 reciprocate at various times, both with respect to each other and with respect to the pallet 12b and the pallet 12a containing front mold curves.

With reference to FIGS. 13(b) and 14, the vacuum manifold housing 272 and the primary housing 273 are mounted for reciprocal movement on cylinders or tubes 274,275 and reciprocate with respect to stationary frame member 276 in response to servo motor 277 which raises and lowers a reciprocating support platform 278. Drive motor 277 is fixably attached to frame member 276 by means of guide tubes 279 and 280 and cross-member 281. Thus, the stationary frame member 276, guide tubes 279,280 and cross-member 281 provide a box frame that is stationary with respect to the reciprocating members of the apparatus. The pallet guide rails 282 are also fixed with respect to the stationary fixed platform 276. As indicated previously, the pallet 12a,b entering the apparatus 59 is advanced through the pallet guide rails 282 by means of the material handling pusher 157 and conveyor 32b previously described and illustrated with respect to FIG. 9.

As illustrated in FIG. 13(b), the vacuum manifold housing 272 and the primary housing 273 reciprocate with respect to each other with the vacuum manifold housing 272 being biased downwardly by a pair of spring members 283,284 positioned on opposite sides of the respective housings. The vacuum manifold housing 272 is secured to the primary housing 273 by virtue of a pair of bolts 285,286, one of which is illustrated in cross-section in FIG. 13(b) as 285, which are free to reciprocate upwardly into recesses such as recess 287 formed in the primary housing. Likewise, the reciprocating pistons 271 and reciprocating manifold members 288,289 also provide reciprocating guides and support between the two housing members 272,273.

A pair of bore scope housings 290 and 291 provide access for a bore scope 200 and an optic probe 201 which may be inserted into the assembly cavity for viewing or quality control purposes. When not in use, the bore hole housings 290,291 are closed by a blind 202 in order to allow a vacuum to be drawn within the assembly housing.

In operation, a pallet 12b containing mold half back curves is advanced under the reciprocating pistons 271 as was previously described with respect to FIG. 12(c). When the pallet is in position, the assembly module 59 is reciprocated downwardly by pneumatic drive motor 277 and cross-member 278 and the reciprocating tubes 274,275 to draw both the vacuum manifold housing and the primary housing downwardly. The vacuum manifold housing 272 is biased in its downward position by means of springs 283, 284 and the individual reciprocating pistons 271 are biased downwardly by virtue of their mounting within the vacuum manifold housing 272, and by virtue of air pressure maintained within the pneumatic cylinders 293 mounted in the upper portion of primary housing 273 that are pressurized by plenum cavity 203 which connects each of the cylinders 293 to a common air pressure service. Within approximately 0.25 seconds, the reciprocating pistons 271 have engaged the back curve mold halves 131 on pallet 12b and a vacuum is drawn through vacuum manifold in reciprocating piston 271, which has radial bores 294 (FIG. 12(d)) which communicate with an annular chamber 295 formed in the vacuum manifold housing 272, two of which are illustrated in FIG. 13(b) and 14. Each of these annular chamber passageways 295 is interconnected to each other and a common plenum 97 that extends across all 4 annular manifolds 295 on one side of the vacuum manifold housing 272.

A pair of reciprocating vacuum manifolds 288,289 connect the vacuum manifold 272 with the primary manifold 273, with one of the tubes 288, illustrated in cross-section in FIG. 13(b). The vacuum manifold 288 reciprocates in bore 298, while vacuum manifold 289 reciprocates in bore 299. These reciprocating manifolds are essentially identical, except that they supply vacuum at two different pressures to two different parts of the assembly module.

As the assembly module reaches its lower most point of travel, each of the back curves is removed from the back curve mold pallet 12b by the vacuum drawn in the reciprocating pistons 271. The entire assembly module 59 is then reciprocated upwards in approximately 0.25 seconds to enable transport of the empty pallet 12b along conveyor 32b out of the assembly module and the insertion of a new pallet 12a that is filled with front curve mold halves, each one of which has been dosed with a monomer at the filling module 53. Pallet 12a is advanced into position as previously described with respect to FIG. 9, but is registered in precise position by means of tapered registration pins 306,307 which cooperate with the blind registration holes 129a,129b formed on pallet 12a as illustrated in FIG. 4(a). The taper on pin 306 is sufficient to register the pallet within 35 0.1 mm for the purposes of precision assembly of the mold halves.

The assembly cycle begins be reciprocating both the vacuum manifold housing 272 and the primary housing 273 downwardly until a perimeter seal 310 contacts the outer perimeter 140 of the pallet 12b. As contact is made with the perimeter seal, a vacuum switch is actuated by means of a proximity switch adjacent to reciprocating cross-head 278 which actuates a second vacuum source which is drawn through vacuum tube 311 and the interior of reciprocating drive tube 274 to evacuate the chamber formed between the vacuum manifold housing 272 and the platform 12a.

It should be noted that the vacuum drawn in the two reciprocating drive tubes 274,275 is slightly different, with the vacuum drawn in the tube 275 being slightly greater than that drawn in tube 274 in order to insure that the back curves are retained on the reciprocating pistons 271 prior to their deposition on the monomer and the front curve mold half. In the preferred embodiment, the pressure drawn in the vacuum manifold around the pallet 12b is on the range of 5 to 7 millibars while the vacuum drawn within the reciprocating pistons 271 is on the order of 3 to 5 millibars.

After the vacuum has been established in the vacuum manifold housing 272, the vacuum manifold housing ceases to reciprocate and remains stationary with respect to the pallet 12a. However, the upper or primary housing 273 continues to reciprocate downwardly enabling the back curves to contact the monomer and slowly displace it outwardly to fill the mold cavity as the two mold halves are assembled. The vacuum maintained around the housing enables the assembly of the two curves in a more rapid and expeditious manner than if assembled under ambient $N^2$ pressure. When assembled under vacuum, the deposition speed may reach as high as 5 mm per second, whereas without vacuum, any speed greater than 0.2–1 mm per second may result in undue agitation of the monomer and the creation of bubbles which effect and impair the quality of the resultant lens. Further, if a vacuum is not drawn, it is possible for nitrogen to be trapped between the mold halves or between the monomer and the back curve thereby creating another bubble or puddle which will result in rejection of that lens.

Independent travel of the two manifolds 272,273 is provided since the vacuum manifold housing 272 no longer reciprocates downwardly after is it seated on pallet 12a. However, the upper primary housing continues to reciprocate downwardly depositing the back curve mold half, and continuing on to thereby completely compress springs 283 and 286. As these spring members are compressed, the reciprocating pistons 271 float between the back curve mold halves 33 and pneumatic cylinders 293 mounted for reciprocation in manifold 273, which has been pressurized to a predetermined pressure. Thus, the final clamping pressure is generated on the back curve mold member, as determined by the air pressure maintained in pneumatic cylinders 293, and not by spring members 283,284, or the pressure generated by drive motor 277. This enables independent reciprocal movement or floating movement of each of the reciprocal pistons 271, while enabling all of the pistons to be pressurized to a common predetermined value. Thus, misalignment of a single mold part will not destroy the entire batch of mold assemblies on pallet 12a.

As was described earlier with respect to FIG. 12(d), the optional clamping pressure seats the back curve mold half on the front curve mold half and seats the convex portion of the curve against the parting ring 131c formed on the front curve mold half thereby severing the monomer in the lens blank 132 from the monomer in the excess HEMA ring 132a. Also, after the mold halves have been seated, the vacuum in each of the reciprocating pistons 271 is first broken by opening a valve (not shown) in vacuum line 304. Shortly thereafter, and after a predetermined clamping period and a predetermined clamping pressure, the vacuum between the vacuum manifold housing and the pallet 12a is broken by opening a valve in vacuum line 311. Typically the period is 0.5 to 3 seconds, but preferably is 1.5 seconds. The clamping pressure may range from 0.5 to 2 kgm/lens, but, preferably is 1 kgm/lens. Thereafter, drive motor 277 is actuated and the entire assembly module 59 is raised upwardly and reset for a new back curve pickup and a new cycle of operation.

As illustrated in FIG. 9, after exiting the mold assembly module 59 of apparatus 50, the pallets 12b that had transported the back curve lens mold portions are empty and are recirculated back to the supply conveyor 29 to pick-up a new set of back curve lens molds from the injection mold facility 30. To accomplish this, ram assembly 35 having a reciprocating ram 155 and ram head 156 is enabled to push the empty pallet 12b from position indicated as "E" along conveyor 29b in FIG. 9 in the direction indicated by arrow "F" where the back curve supply conveyor 29 picks up the pallet 12b for recirculation at the back curve lens mold pick up point. Additionally, as shown in FIG. 9, a second reciprocating ram 155' and ram head 156' is provided to push, in the direction indicated by arrow "F" along conveyor 27b, a pallet 12a containing front curve lens molds back to the front curve supply conveyor 27. This is done only if the line quality control system indicates that a pallet 12a contains a lens mold assembly having mold halves that are misaligned, that are not seated correctly in a pallet recess, are out of specification in some manner with respect to required residing times at various stations, or, that are detected as not containing the proper amount of monomer mixture in the cavity formed between the mold halves. Detection of errors may occur at a variety of locations in the production line, including the filling and mold assembly station 50 and the individual pallets are flagged by quality control device (not shown) so they may be rejected by ram 155' for recirculation. The contact lens production line facility includes a suction vent apparatus for removing the mold assemblies from the rejected pallet 12a while being recirculated back to or while on front curve supply conveyor 27.

Figure 15A:
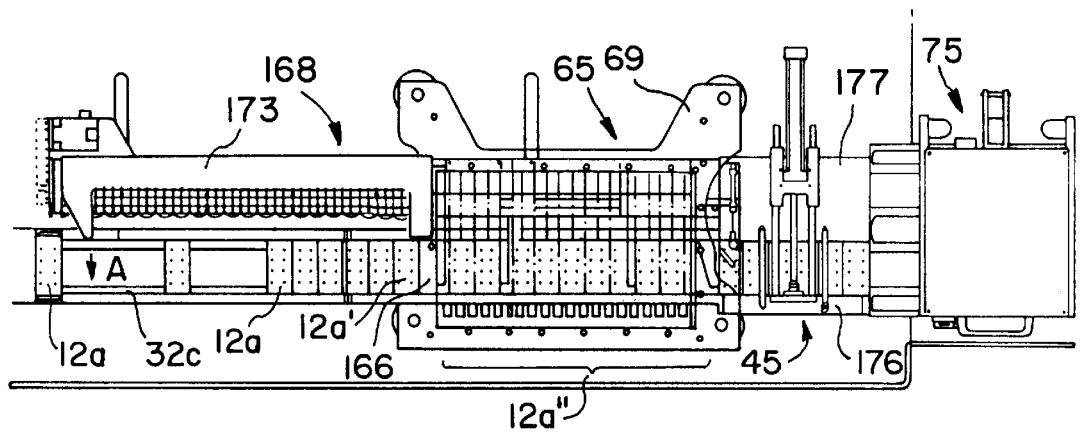

As shown in FIG. 15(a), the individual pallets 12a containing the eight contact lens mold assemblies leave the filling/mold assembly apparatus 50 on conveyor 32c at a rate of 10 mm/sec (+/−5 mm/sec) before entering the precure assembly 65 where the front and back curve mold halves are then clamped together in the precure step to displace any surplus monomer from the mold area and to properly align the mold halves by alignment of the mold flanges 131a, 133a. As will be explained below, while the mold halves are clamped under pressure, the polymerization mixture is then exposed to actinic light, preferably from a UV lamp. Typically the mold halves are clamped for approximately 40 seconds with 30 seconds of actinic radiation. At the completion of the precure step, the polymerization mixture has formed a partially polymerized gel, with polymerization initiated throughout the mixture. Following the precure step, the monomer/solvent mixture is then cured in the UV oven apparatus 75 whereby polymerization is completed in the monomer(s). This irradiation with actinic visible or ultraviolet radiation produces a polymer/solvent mixture in the somewhat diminished shape of the final desired hydrogel lens.

As illustrated in FIG. 15(a), the conveyor 32c delivers pallets 12a containing a plurality of molds to an accumulating section generally indicated as 168 which assembles a plurality of pallets for a batch operation at the precure assembly 65. Accumulator section 168 includes a holding mechanism 166 that is timed by a control device (not shown) to halt a lead pallet in place on the conveyor 32c and enable a predetermined number of subsequent pallets to assemble behind the halted lead pallet to enable batch processing at the precure apparatus. In the preferred embodiment, twelve pallets are accumulated enabling up to ninety-six (96) mold assemblies to be processed at the precure apparatus 65 in a batch mode for an extended period of time of 30 to 60 seconds while continuously receiving new pallets from the production line at the rate of 1 every 6 to 12 seconds.

FIGS. 15(a)–15(e) illustrate the sequence for enabling batch processing of the mold assemblies at the mold clamping and precure apparatus 65. FIG. 15(a) illustrates conveyor 32c delivering twelve pallets 12a containing the plurality of molds to the accumulating section 168. As shown in FIG. 15(a), lead pallet 12a' is halted behind holding mechanism 166 while the rest of the pallets accumulate therebehind. It can be seen from FIG. 15(a) that up to twelve pallets indicated generally as 12a", are being processed in the mold clamping and precure assembly 69 while the new set of pallets are being accumulated in accumulating section 168, thus, assuring a continuous flow of pallets into the precure assembly.

Figure 15B:
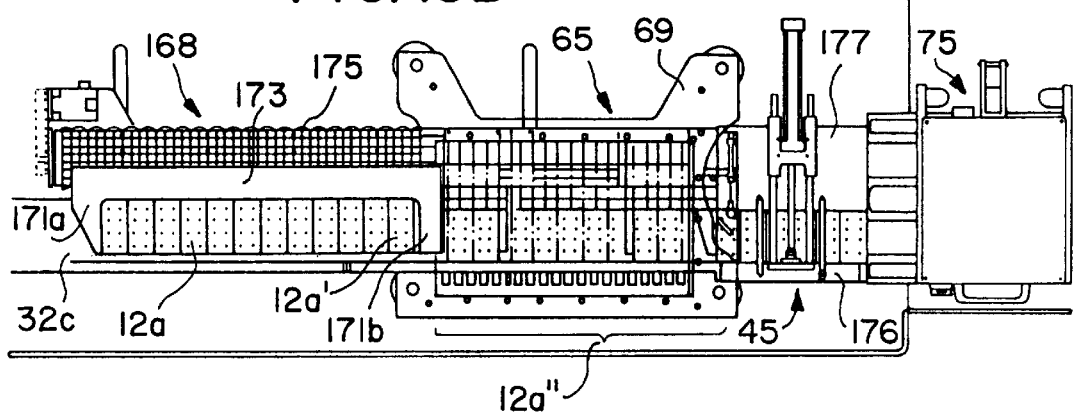
Figure 15C:
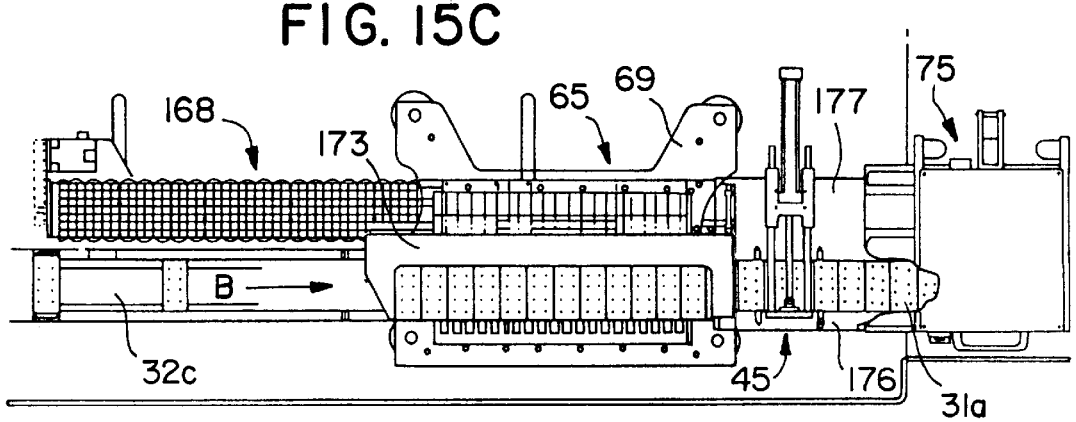

After accumulating up to twelve pallets in accumulating section 168, holding mechanism 166 is retracted and the batch pusher arm 173 is extended in the direction indicated by arrow "A" (FIG. 15(a)), to align the twelve pallets on the conveyor 32c conveniently within arms 171a,171b of arm 173 as shown in FIG. 15(b). It is understood that a suitable track mechanism 175 and driving means (not shown) is provided for enabling bi-directional and orthogonal horizontal movement of batch pusher arm 173. Once the 12 pallets are aligned between arms 171a,b of batch pusher arm 173, the pusher arm is driven in the horizontal direction indicated by arrow "B" as shown in FIG. 15(c). The previous set of twelve pallets 12a" that had been undergoing mold clamping and precure are simultaneously pushed out of the precure assembly 69 by the arm 171b of batch pusher 173 as the new sets of pallets are brought in by the batch pusher 173 as shown in FIG. 15(c). In the partially exposed view of the UV polymerization oven in FIG. 15(c), six (6) of the previous set (12a") of pallets are pushed onto a conveyor 31a, thus, dividing the set into two batches of six pallets each for entry into the batch UV cycling polymerization apparatus 75 (FIG. 1) as described hereinbelow.

As shown in FIG. 15(d) after the new batch of twelve pallets are brought into precure apparatus 65 for mold clamping and precure, the batch pusher arm 173 is retracted back within track 175 and the batch ram assembly 176 of batch switching apparatus 45 is simultaneously extended to push the other six pallets of the previous batch (12a") to an entry area 177 where the six pallets will be pushed back on to a second conveyor for transport into the UV cycling polymerization apparatus 75.

After the batch ram assembly 176 pushes the six pallets into the entry area 177, the assembly 176 is retracted back to its original position as shown in FIG. 15(e). After the batch ram assembly 176 is retracted, the batch pusher arm 173 is extended in a horizontal direction indicated by arrow "C" in FIG. 15(e) to push the six pallets onto a second conveyor 31b as shown partially hidden in the figure. The batch ram assembly then reciprocates in the opposite direction to arrow "C", to the position as illustrated in FIG. 15(a) where it awaits assembly of the next batch of 12 pallets.

FIG. 16 illustrates a side elevation view of one embodiment of the precure apparatus 65. As illustrated in FIG. 16, the precure apparatus receives a plurality of pallets having a plurality of contact lens molds therein, from the infeed conveyor 32c. The infeed conveyor 32c delivers the pallets 12a and mold assemblies to a low oxygen environment, which environment may be accomplished by pressurizing an enclosure 126 with nitrogen gas. Prior to polymerization, the monomer is susceptible to oxidation from oxygen which results in degradation of the resultant lens.

The precure assembly 69 of the precure apparatus 65 is partially visible in the breakway portion of FIG. 16. As explained in further detail in co-pending U.S. patent application Ser. No. 08/257,792 entitled "Mold Clamping and Precure of a Polymerizable Hydrogel" assigned to the same assignee as the instant invention and the disclosure of which is incorporated by reference herein, the assembly is raised and lowered into engagement with pallets containing contact lens molds by virtue of a pneumatic cylinder 120 which raises and lowers an intermediate support beam 121 and reciprocating shaft members 122 which are journaled for reciprocating support in member 123. After the precure operation, the pallets with contact molds therein are discharged through an airlock mechanism 124 for subsequent cure by heat and cycled actinic radiation.

Figure 18:
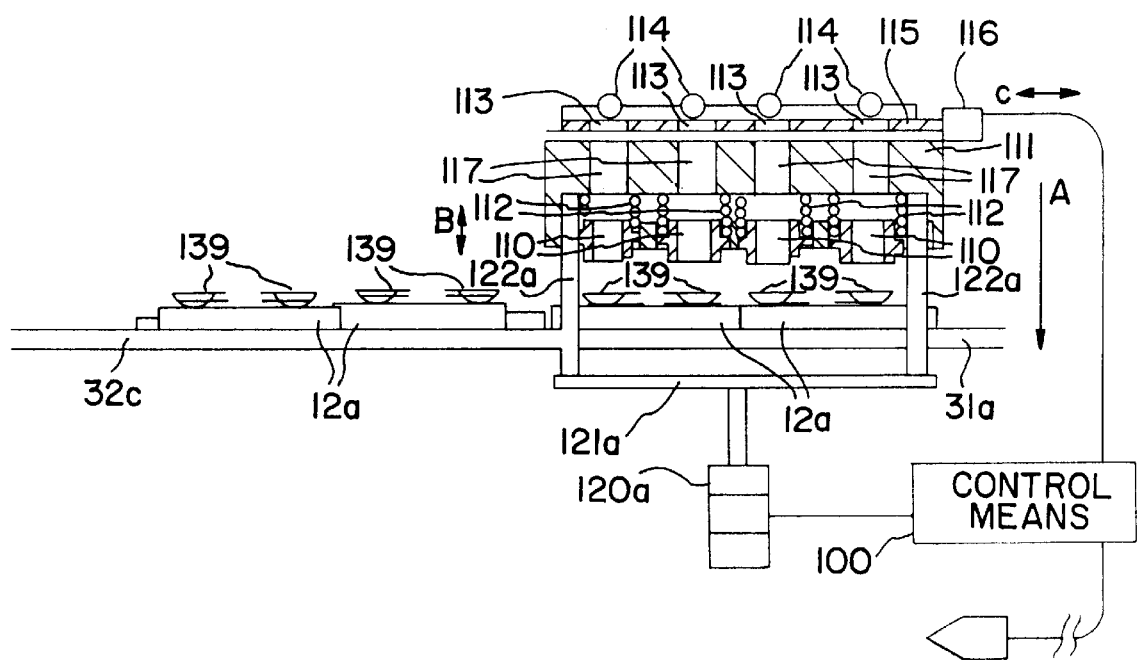
FIG. 18 is a diagrammatic and schematic illustration of the mold clamping apparatus 69 of precure and mold clamping apparatus 65.

FIG. 18 is a diagrammatic representation of a portion of the precure assembly 69. The assembly 69 includes multiple vertical reciprocal movements, a first one of which is in response to movement from air cylinder 120a and reciprocating beam 121a. As the precure apparatus 69 is lowered in the direction illustrated by arrow A, a plurality of annular clamping means 110 will engage the upper annular flange 133a of each of the mold halves contained within pallets 12a. The plurality of annular clamping means 110 are mounted on and travel with a reciprocating platform 111 of the apparatus, and are resiliently mounted therein for a second reciprocal movement along the directions of arrow B illustrated in FIG. 18.

As illustrated in FIG. 18, the clamping means 110 are biased within frame 111 by springs 112 (illustrated diagrammatically) which may be an air spring, a helical spring, or, simple weights. As the apparatus is lowered, the clamping means will engage and clamp the first and second mold halves together with the force determined by the spring or weight means 112. When air springs are used, the force will be determined by the amount of pressure provided to the air cylinder (not shown). While clamping means 110 have been illustrated as four members in FIG. 18 for illustrative purposes, it is understood that in the embodiment illustrated in FIG. 18 there are 96 individual clamping means, with an individual clamping means for each of the mold halves.

Positioned above the clamping apparatus are a plurality of actinic light sources 114 which may be UV lamps. After the clamping means has engaged the mold halves to clamp them together, a shutter mechanism 115 is opened by air cylinder 116 to enable the actinic light source 114 to initiate polymerization of the polymerizable composition in each of the mold halves 139. Shutter 115 has a plurality of openings 113 defined therein and is reciprocal along the x axis as indicated by arrow C in FIG. 18 in order to open and close exposure passage ways 117.

The operation of the precure apparatus 69 is set by control circuit 100 which controls the duration of the clamping period by the length of time air cylinder 120a is activated to its reciprocal down position. Control circuit 100 also controls the amount of radiation received by the molds controlling the duration of the exposure period through operation of shutter 115 and the air cylinder 116. The intensity may also be manually adjusted by raising or lowering the lamps 114 with respect to molds 139.

The amount of force applied by clamping means 110 may be varied from approximately 0.1 Kgf to 2.0 Kgf, and preferably 0.5 to 1.0 Kgf, and is applied to keep the flange 133a of the second convex mold half parallel to the flange 131a of the first concave mold half for the duration of the exposure. The clamping weight is applied for 10 to 60 seconds, but typically for a period of 40 seconds by control means 100. After approximately 10 seconds of weight, actinic radiation from UV lamps 114 is applied to the assembled mold and the polymerizable monomer. Typically, the intensity of the UV light source is 2–4 mW/cm$^2$, and this intensity of light is applied for 10 to 50 seconds, but in the preferred embodiment, is applied for 30 seconds. It is understood that different intensities and exposure times could be used, including pulsed and cycled high intensity UV on the order of 10 to 150 mW/cm$^2$ with exposure times running from 5 to 60 seconds.

The mold halves are first clamped together for a predetermined period of time, prior to exposure, in order to allow equilibrium to develop between the monomer and the mold cavity, and to allow any excess monomer to be extruded out of the mold cavity into the space between flanges 131a and 133a where it forms a ring of excess monomer 132a, generally referred to as a HEMA ring when hydroxyethylmethacrylate monomer is used, as shown in FIG. 5(b). As mentioned above, the concave front mold cavity includes a sharp annular edge 136 to cleanly contact the convex portion of mold half 133 and thereby separate the contact lens 132 from the HEMA ring 132a. The pre-exposure clamping period allows for any excess monomer to migrate from the mold cavity to the HEMA ring, enables the second mold cavity to seat cleanly on parting edge 136, and allows an equilibrium to develop between the mold halves and the monomer.

At the end of the radiation period, the shutter 115 is closed by reciprocating it to the right as illustrated in FIG. 18 and the weight is removed by energizing cylinder 120a to lift the precure assembly 69 upwardly by means of push rods 122a. As the assembly 69 is lifted, the clamping means 110 will be lifted clear of the molds and pallets to enable them to be transported out of the precure means as described above by means of conveyors 131a,b. During the precure time, the temperature in the system may be varied from ambient to 50° C.

At the conclusion of the precure process, the monomer has gone through initiation and some degree of polymerization. The resultant lens is in a gel state with some areas of the lens that have the least thickness, i.e., the edge, having a higher degree of polymerization than the body.

Figure 17:
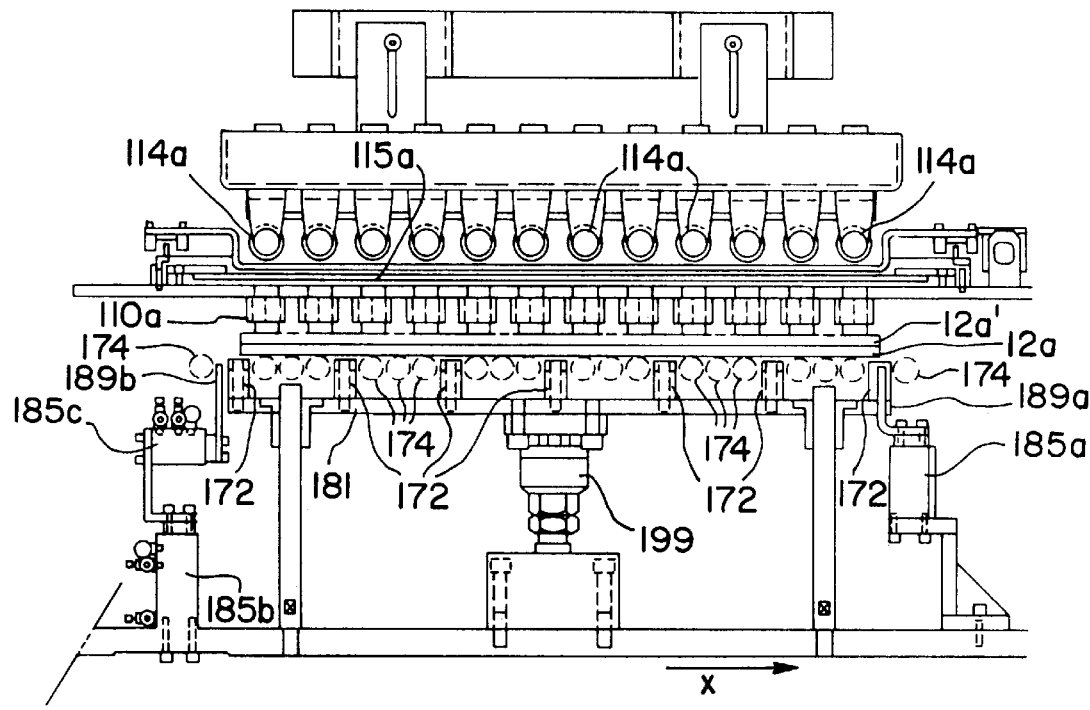
FIG. 17 is a side elevational view of a second embodiment for handling pallets at the precure and mold clamping apparatus 65 illustrated in FIG. 11.

FIG. 17 depicts a second embodiment for the batch handling of pallets 12a at the precure station. As described above with respect to FIGS. 16 and 18, the first embodiment reciprocated the UV lamps and clamping members into and out of engagement with the mold halves and pallets carried by conveyor means 32c. In the embodiment illustrated in FIG. 17, the UV lamps are stationary, and the pallets 12a are lifted from the conveyor 32c into engagement with the clamping means for the precure period.

The clamping means utilized by the embodiment illustrated in FIG. 17 utilizes the clamping means 110 previously described with respect to FIG. 18. In this second embodiment, a plurality of clamping means 110a are mounted above a roller conveyor illustrated in side view in FIG. 17 by rollers 174. A plurality of lifting standards 172 are positioned between groups of rollers 174 on centers approximate the width of the pallets 12a. In FIG. 17, a first row of pallets 12a is depicted resting on rollers 174 with adjoining edges of each of the pallets aligned along the top of the lifting standards 172.

The pallets 12a are aligned in position by means of stop means 189a which is lifted by air cylinder 185a during the loading of the precure apparatus. During loading of the device, the stop means 189a is reciprocated upwardly, and the requisite number of pallets 12a are advanced into the precure apparatus. When 6 pallets in each row have been advanced, a second stop means 189b is lifted by air cylinder 185b to define a limit on x axis travel as illustrated in FIG. 17. A separate air cylinder 185c is used in cooperation with stop means 189a to align the adjoining edges of the pallets 12a above the centers of the lifting standards 172. After the pallets have been aligned, the lifting standards 172 are reciprocated upwardly by means of intermediate support frame 181 and a pair of pneumatic motors generally indicated as 199.

The pallets are reciprocated upwardly to the position illustrated at 12a' in FIG. 17, in which position they engage the clamping member 110a as previously described. Each of the clamping members 110a also include a separate independent and resilient spring, as described in aforementioned co-pending patent entitled "Mold Clamping and Precure of a Polymerizable Hydrogel" for driving clamping member 110a and the upper mold half against the lower mold half during the precure period.

After the pallets and mold halves have been raised by air cylinders 199 and the first and second mold halves clamped together by means of clamping means 110a, a reciprocating shutter 115a is shifted as illustrated in FIG. 17 to align a plurality of openings therein with the central openings formed in the clamping means 110a and thereby enable exposure of the monomer in the mold halves by means of actinic light sources 114a as described generally above with respect to FIG. 18. The clamping period and the amount of exposure to radiation are controlled by a control circuit in the manner previously described.

Following the precure of the monomer in mold assembly 139, the pallets 12a are reciprocated downwardly to the position illustrated in FIG. 17 and advanced by conveyor rollers 174 to a subsequent conveyor as will be described in detail below which transports the pallets to the polymerization apparatus.

Figure 19A:
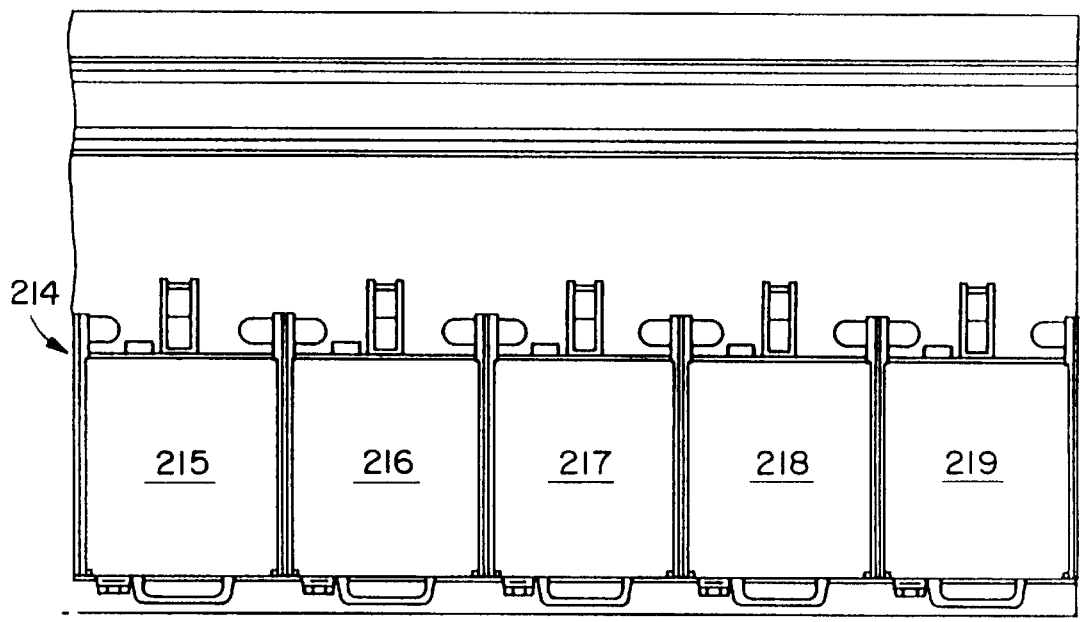
FIG. 19(a) illustrates the plan view of the UV-polymerization ovens where two tracks of pallets containing lenses are polymerized.

As described above, after leaving the precure apparatus 65, the individual pallets 12a containing the eight contact lens mold assemblies enter the UV-polymerization assembly 75 on two tracks 31a,b as shown in FIG. 1. In the UV-polymerization assembly 75, the pallets are conveyed at a rate of approximately 5.5 mm/sec. FIG. 19(a) illustrates the plan view of the UV-polymerization ovens 215–219.

After the polymerization process is completed, the two halves of the mold are separated during the demolding step leaving the contact lens in the first or front curve mold half, from which it is subsequently removed. It should be mentioned that the front and back curve mold halves are used for a single molding and then discarded or disposed of.

Figure 19B:
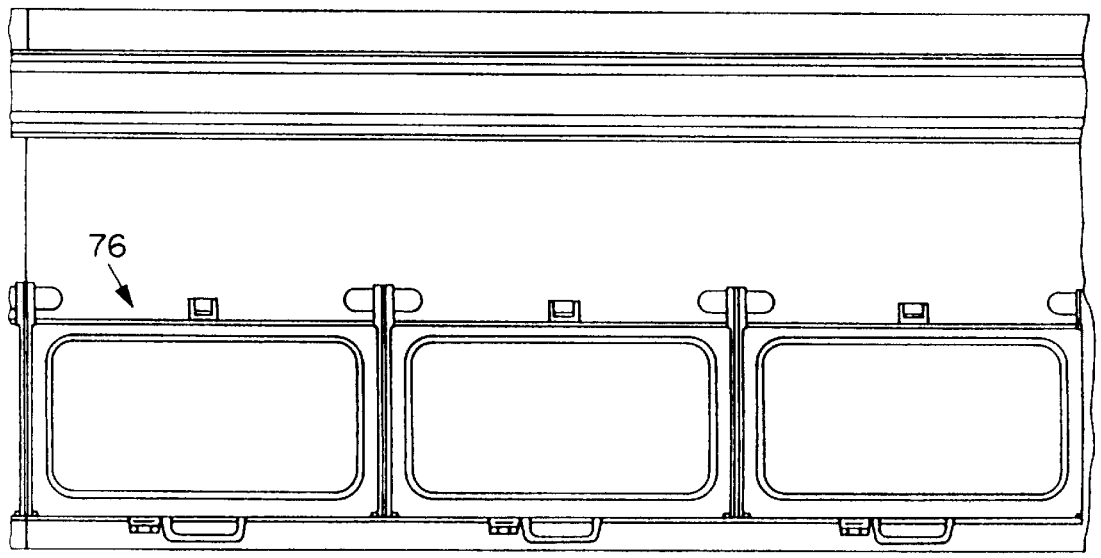
FIG. 19(b) illustrates the plan view of the demold buffer for adjusting the ambient temperature of the mold assemblies prior to demolding.

As illustrated in FIG. 19(b) which is a continuation of FIG. 19(a), the pallets containing the polymerized contact lenses in the mold assemblies exit the polymerization oven apparatus 214 and enter a de-molding buffer 76 having an ambient temperature of 30° C. to 85° C. for preparing the mold assemblies for subsequent de-molding. As shown in FIG. 20, the pallets containing mold assemblies exit the de-mold buffer 76 along two conveyors 31a,31b, and enter into the demold assembly 90. The pallets are transferred from their conveyors and positioned along a respective transport carrier 182a,182b of dual walking beam 180. As illustrated in FIGS. 21(a)–(c), each transport carrier 182a, 182b comprises a plurality of respective spaced apart push blocks, such as the eight labelled 184a,b,c,d and 186a,b,c,d, that move horizontally to precisely transport a pallet containing mold assemblies to the demold apparatus 90.

To position a pallet 12a from conveyor 31a to transport beam 182a of dual walking beam 180, the pallet is first clamped by upstream clamping jaws 186a,b as shown in FIG. 20. In a timed manner under control of suitable control means, the pallet is released and positioned on a pair of carrier guide tracks 183a,b between a pair of push blocks, e.g., 184a,184b of carrier 182a as shown in FIG. 21(a), for transport through the demolding apparatus 90. In a similar fashion, to transport a pallet 12a from conveyor 31b to transport beam 182b of dual walking beam 180, the pallet is first clamped by upstream clamping jaws 187a,b (FIG. 20), and then timely positioned on a second pair of carrier guide tracks 183c,d (FIG. 21(a)) between a pair of push blocks, e.g., 186a,186b of carrier 182b for precision transport through the demolding apparatus. The operation of transport carrier 182a of dual walking beam 180 will now be described in further detail with the understanding that the principles and methods underlying the operation apply equally to transport carrier 182b.

A detailed view of transport carrier 182a(,b) of dual walking beam 180 is shown in FIGS. 21(a)–(d). As shown in FIG. 21(a), the transport carrier 182a(,b) includes a reciprocating carrier beam 179a(,b) having plurality of push blocks 184a,b, . . . etc. (186a,b, . . . etc.), spaced equally apart on the respective carrier beams 179a(,b) at a distance approximately equal to that of the length of a pallet. Each carrier beam 179a,b is mounted for horizontal reciprocating movement in the directions indicated by the double-headed arrow "A-B" in FIG. 21(a) for advancing the pallets 12a along respective guide tracks 183a(,b) and 183c(,d) through the demold apparatus, and, is additionally mounted for reciprocating movement in the vertical direction as indicated by double-headed arrow "A'-B'" in FIG. 21(d).

As shown in FIG. 21(*d*), each guide track 183*a,b* includes a pair of tracking guide rails or shoulders 188*a* and 188*b* for mating with respective grooves 28*a,b* of the pallet as described above. The paired set of shoulders 188*a,b* and respective guide rails notches 28*a,b* of the pallet keep the pallet precisely aligned as it is being advanced by carrier beam 179*a* throughout the demold apparatus, and, further prevents any vertical movement of the pallet 12*a* when the mold assemblies 139 are demolded. The height of a push block, e.g., block 184*a*, is such that it will engage the edge of a pallet when the transport beam 179*a* is vertically reciprocated to the position indicated by arrow "A'" when advancing the pallet through the demold apparatus 90, and, will disengage the edge of the pallet when carrier beam 179*a* is vertically retracted to a position indicated by the arrow "B'".

As previously mentioned above, as shown in FIGS. 21(*a*)–(*c*), a pallet 12*a* is first positioned on the parallel set of tracks 183*a,b* between the first two push blocks 184*a* and 184*b*. To advance the pallet, the transport carrier beam 179*a* is driven forward in the direction indicated as "C" in FIG. 21(*b*), so that push blocks 184*a,b* engage pallet 12*a* to advance its position along the guide tracks 183*a,b* from its previous position shown in FIG. 21(*a*). Thus, the pallet 12*a* shown positioned in FIG. 21(*a*) is now shown as broken lines in an advanced position between push blocks 184*a,b* in FIG. 21(*b*). Immediately after advancing the pallet 12*a*, the transport carrier beam 179*a* is retracted in a vertical direction beneath the plane of the carrier rails 183*a,b* so that the carrier beam (and push blocks thereof) may reciprocate horizontally beneath the pallet to its original position in the direction "A" as indicated in FIG. 21(*a*).

After reciprocating horizontally to its original position, the carrier beam 179*a* (and push blocks 184*a,b*, . . . etc.) is extended vertically to its original position where the push blocks 184*a,b* engage a newly registered pallet 12*a* from conveyor 31*a*, as shown in FIG. 21(*c*). Additionally, the first pallet 12*a* that had been advanced on carrier rails 183*a,b* is now engaged between push blocks 184*b,c*. By continuous reciprocation of each transport carrier beam 179*a*(,*b*) of dual walking beam 180, a precise and continuous flow of pallets through the mold separation apparatus 90 is assured. The specific mechanisms for enabling reciprocating horizontal and vertical motion of the transport carriers beams 179*a*, (179*b*) and push blocks 184*a,b*, . . . etc., (186*a,b*, . . . etc.) thereof, will now be described.

FIG. 22 illustrates a partially cut side view of dual walking beam 180 showing transport conveyor 182*a*. As shown in the FIG. 22, the transport carrier beam 179*a* is mounted by suitable mounting means 197 on track 193 for horizontal reciprocating movement thereupon. Motor 191 and suitable drive linkages 192 are provided to precisely control the horizontal movement of the transport carrier beam 179*a* along the track 193 so as to enable push blocks to engage and advance the pallet along the carrier rails 183*a,b*. Additionally, as shown in FIG. 22, the carrier beam 179*a* is retractable in the vertical direction by a series of pneumatic cylinders, two of which 190*a*,190*d* are shown in the figure. The cylinders 190*a,d* and motor 191 are precisely controlled by control means to simultaneously provide for the reciprocation and retraction of the transport carrier beam.

In the preferred embodiment described in detail above, the transport carriers of the dual walking beam carries the pallets containing contact lens mold assemblies to the demold apparatus where, preferably, the flange portions of the front curve and back curve mold halves are gripped and pulled away from each other, either in directly opposite directions or through an angle in a prying sort of motion. Advantageously, the contact lens mold assembly is first heated moderately to facilitate separation of the polymerized article from the mold half surfaces. As explained in further detail in co-pending U.S. patent application Ser. No. 08/258, 265 entitled "Mold Separation Apparatus" assigned to the same assignee as the instant invention, and the disclosure of which is incorporated by reference herein, the demold apparatus 90 includes means for applying a precise amount of heat, which may be in the form of steam or infrared radiation from a lamp or a laser, to the back curve lens mold portion of the contact lens mold assembly, prior to prying apart the back curve mold half from the front curve mold half by a set of pry fingers that are inserted within the gap formed between the overlying flange portions of each mold half of the mold assembly.

As shown in FIGS. 23(*a*) and 23(*b*), the demold assembly 90 includes reciprocating beam 226 carrying two steam discharge assemblies 227*a*,227*b*, one assembly for each pallet situated therein by each transport carrier 182*a*,182*b* of dual walking beam 180. Each steam discharge assembly includes eight steam head nozzles (generally indicated 260) connected to a distribution manifold and a steam heat source (not shown), so that steam may be simultaneously applied to each of the mold assemblies on the pallet. To apply heat, the reciprocating beam 226 is extended from position indicated "A" in FIG. 23(*a*) to position indicated "A'" in FIG. 23(*b*) so that the steam head units precisely engage their respective mold assemblies for applying steam at a carefully controlled temperature and duration. FIG. 23(*b*) shows only steam head assembly 227*b* in engagement with a pallet 12*a*.

As shown in FIG. 23(*c*), during the time the steam discharge apparatus 227*a,b* and the steam nozzles 260 thereof discharge steam to the back curve of the individual lens molds, a set 230*a* of pry tool are extended, as indicated by the arrows, for insertion between the 1.5 mm–3.0 mm gaps formed between the respective front and back curves for each of the four lens molds situated one side of the pallet 12*a*. Likewise, a set 230*b* of pry tools are extended for insertion between the gaps formed between the respective front and back curves of each of the four lens molds situated on the opposite side of the pallet 12*a*.

As further illustrated in FIG. 23(*c*), each set of pry tools 230*a,b* are inserted in a manner such that fingers 235 of a bottom set of the pry tools thereof anchors the circumferential or annular rim portion 131*c* of the front curve of the lens mold to the surface of the pallet, and that fingers 236 of a top set of pry tools by action of a pneumatic drive means thereof will vertically separate (FIG. 23(*e*)) the back curve mold portion of the lens mold from the front curve mold portion without destroying the integrity of the contact lens or either of the mold parts.

Next, as illustrated in FIG. 23(*d*) after discharging the precision controlled amount of steam, the steam discharge assemblies 227*a,b* and the steam nozzles 260 thereof are retracted by respective steam head retraction assemblies 272*a,b* to enable the suction cup assembly unit 290*b* to align with the pallet 12*a* as shown. As shown in FIGS. 23(*a*) and 23(*b*), each suction cup assembly 290*a,b* is mounted for reciprocating movement on beam 226 and each contains eight suction cups (generally indicated as 285) for precise engagement with a corresponding mold assembly on the pallet when the steam discharge assemblies 227*a,b* are retracted.

During the mold separation step illustrated in FIG. 23(*e*), vacuum suction for the suction cup assembly 290*b* is activated, and the top group of pry tools having fingers 236 are caused to separate from the lower group of pry tools 235 by pneumatic drive means 221 to bias the circumferential edges of each of the back curves 133 of each lens mold away from each of the front curves 131 which retain a respective contact lens therein and are anchored by the lower group of pry fingers 235. Thus, the back curve lens molds 133 are effectively removed from their respective front curve lens mold portions and retained by individual suction cups 285.

Figure 23A:
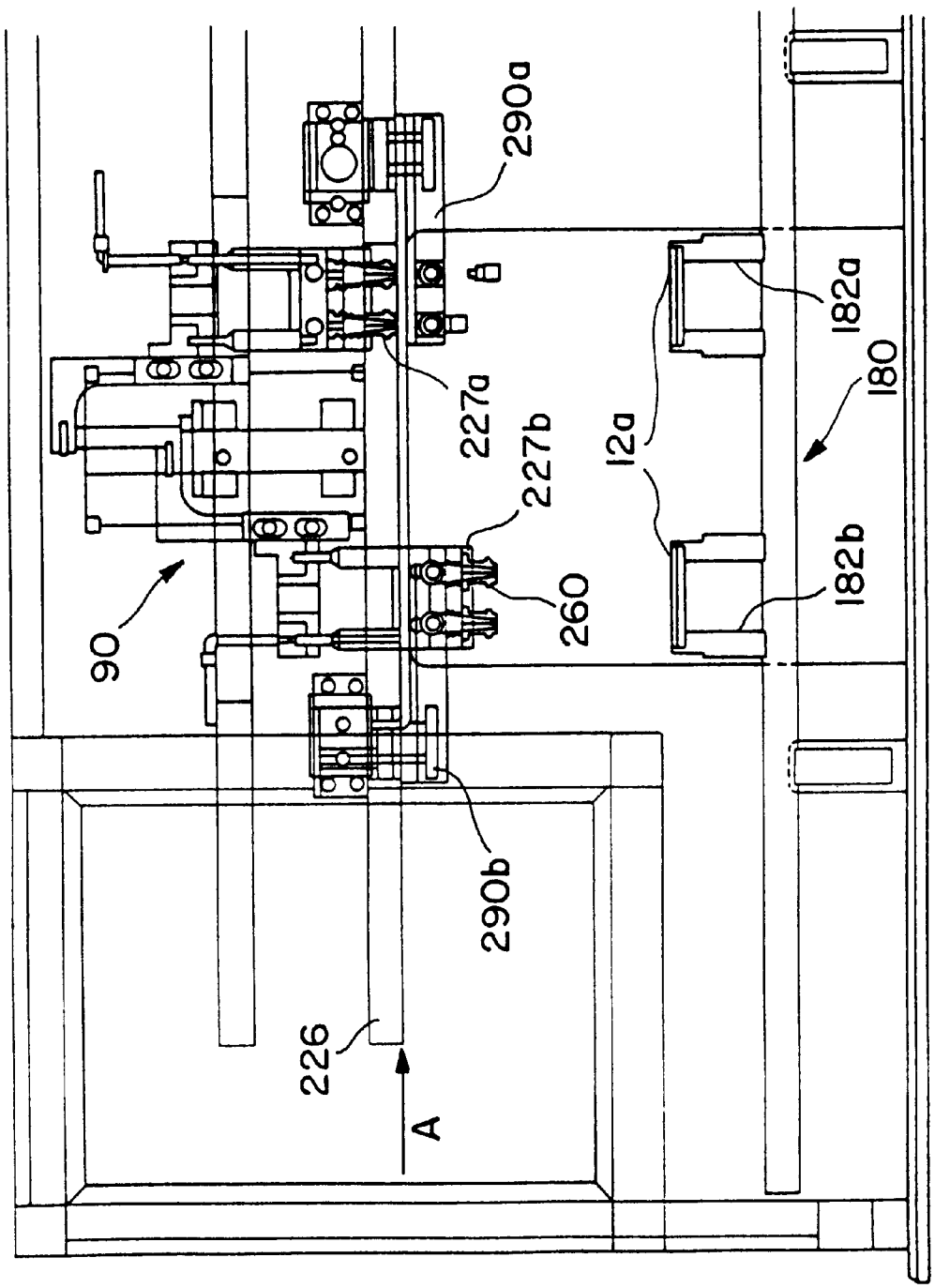
FIG. 23(a) illustrates a front elevational view of the demolding apparatus 90.
Figure 23D:
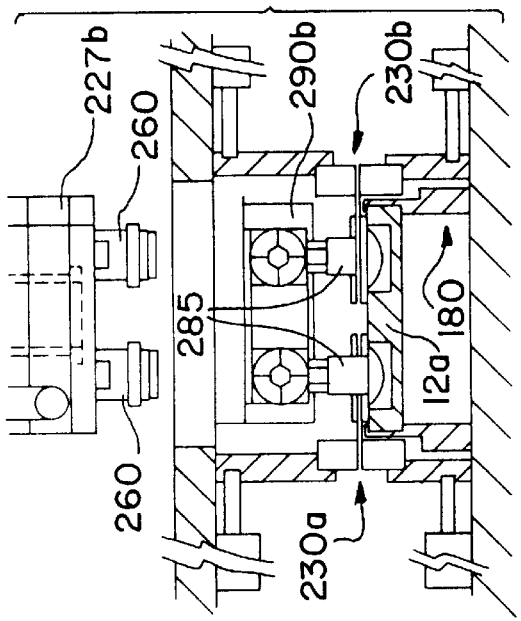
FIGS. 23(c)–23(e) illustrate the sequence for separating the back curve mold half from the front curve mold half and the demolding apparatus used therefor.
Figure 23C:
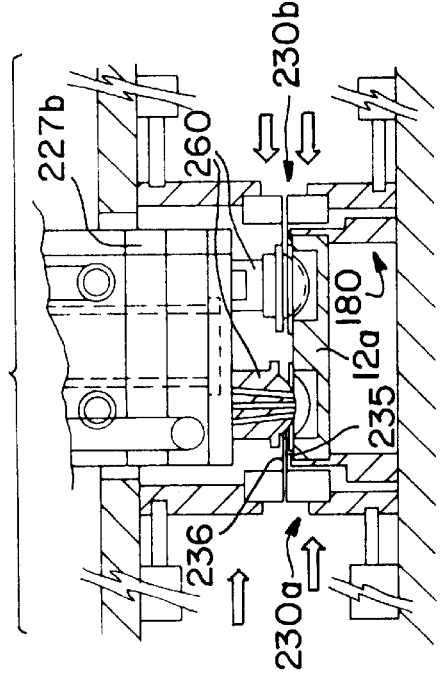
Figure 23E:
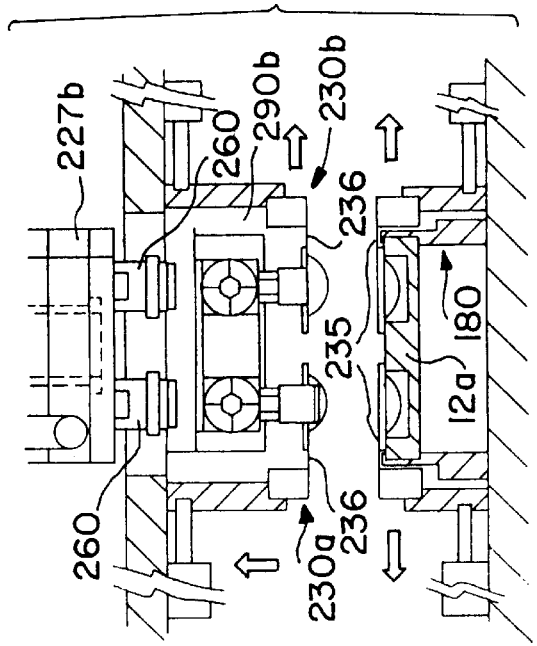

Although not shown, the upper and lower sets of pry fingers 235,236 are finally retracted laterally in opposite directions indicated by the arrows in FIG. 23(e), to allow each pallet 12a now containing up to eight front curve lens mold portions and a respective contact lens therein, to continue along its respective conveyor path, while the suction cups 285 retain the corresponding individual back curve mold portions for disposal. Specifically, the suction cup assembly 290b is retracted to its original position and the vacuum may be removed therefrom so as to release the removed back curve lens mold portions. The separated back curve mold parts are dropped in a bin at the retracted position, and evacuated by a vacuum line (not shown) for disposal.

After the mold assemblies have been separated in the demold apparatus 90, each pallet containing the front curve mold halves with an exposed polymerized contact lens therein, are subsequently transported to a hydration assembly 89 as shown in the conceptual diagram of FIG. 1 and in further detail in FIG. 20. As shown in FIG. 20, a dual pusher 202 having retractable arms is provided to translate the motion of pallets 12a from each transport carrier of dual walking beam 180 to conveyor 31d for transport at a speed of approximately 25 mm/sec to the hydration chamber. Prior to transfer to the hydration chamber, the integrity of the mold halves contained in the pallets are checked to determine if any errors have occurred, for e.g., if a back curve mold half was not separated from a corresponding front curve mold half. The pallet is first clamped between upstream clamping jaws 207a,b where the pallet is appropriately sensed to determine if any error is present. If an error indicating a rejected pallet is found, that particular pallet and the contents therein are transferred from conveyor 31d to recirculating conveyor 31e by suitable pusher assembly 80 as shown in FIG. 20. The clamping jaws 207a,b release the rejected pallet and the pusher arm 80 pushes the pallet to recirculating conveyor 31e where the rejected pallet is conveyed back to the front curve supply conveyor 27. As mentioned above, the contact lens production line facility includes a suction vent apparatus (not shown) for removing the mold assemblies from the rejected pallet 12a while being recirculated back to or while on the front curve supply conveyor 27.

Figure 24A:
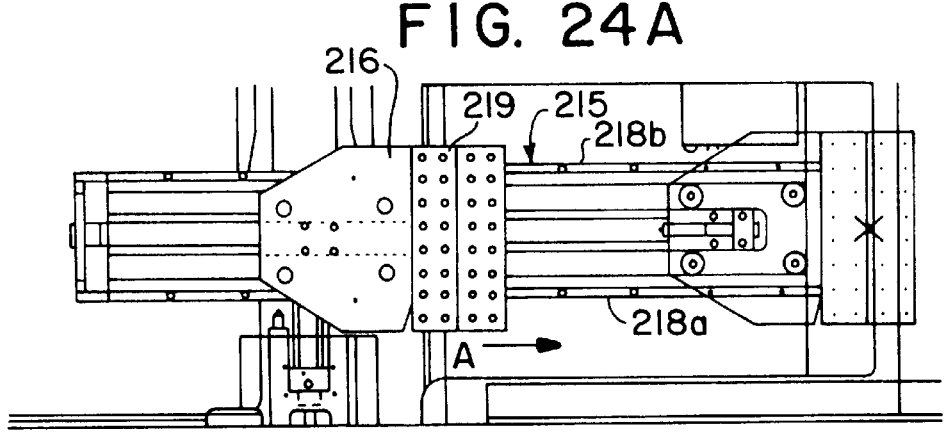
FIGS. 24(a)–24(c) illustrate the sequence for transferring pallets containing polymerized contact lens to the hydration apparatus 89.

If the pallets containing the demolded contact lens assemblies are not rejected, they are alternately clamped by clamping jaws 207a,b and are conveyed as pairs by conveyor 31d to transfer pusher assembly 206 for transference to the hydration assembly 89 (FIG. 1). Prior to entering the transfer pusher 206, the upstream clamping jaws 209a,b temporarily clamp a pallet to enable a pair of pallets to accumulate therebehind. As controlled by the control means, the clamped pallet is released for a time to enable two pallets 12a,12a' to be forwardly conveyed for alignment with reciprocable pusher arm 210 of transfer pusher 206 as shown in FIG. 20. Drive means 211 then enables pusher arm 210 to push the two pallets to a transfer apparatus 215, and specifically, a pallet 216 having a flat plate portion 219, that accommodates up to two sets of two pallets each for transfer to the hydration chamber 89. After the first set of pallets is placed on plate 219, the pusher arm 210 is reciprocated to its original position (FIG. 20) to receive a second set of two pallets. The push arm 210 is then enabled to input the second set of two pallets onto the plate 219 of transfer pusher 216 causing the first set of pallets to advance on the plate. FIG. 24(a) shows the flat plate portion 219 of transfer pallet 216 containing four pallets that have been pushed thereto by pusher arm 210 two pallets at a time.

Figure 24B:
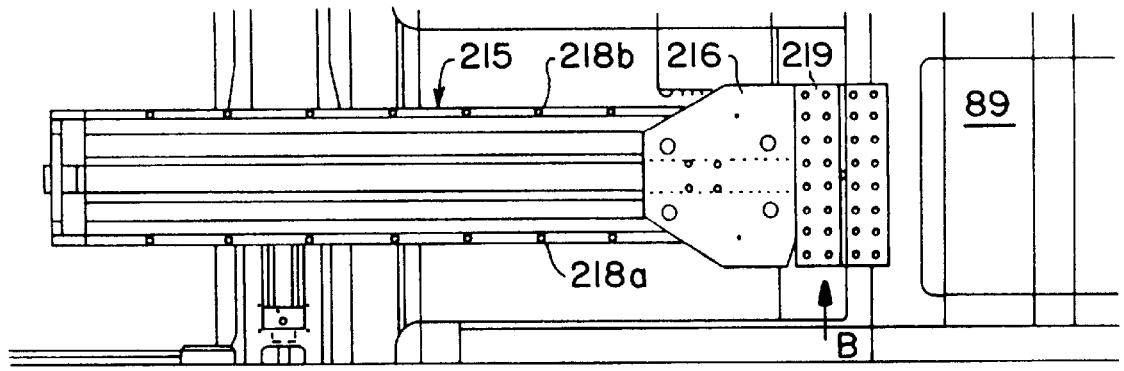
Figure 24C:
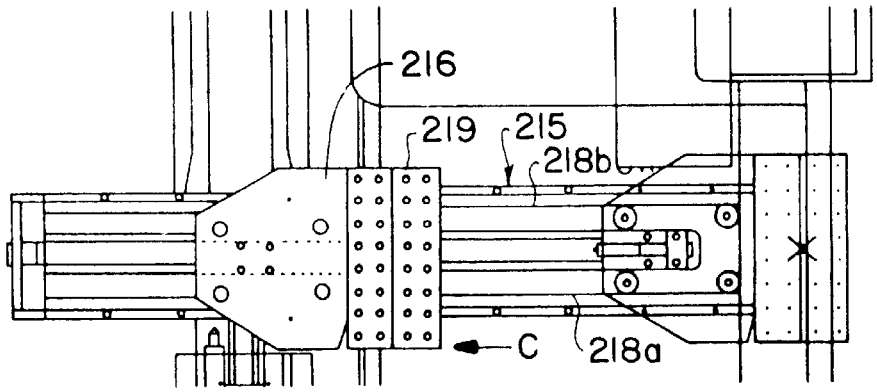

As shown in FIG. 20, the transfer pallet 216 is mounted for reciprocating horizontal movement on tracks 218a,b. In steady state operation, suitable drive means (not shown) enables transfer pallet 216 and plate 219 carrying four pallets to move across tracks 218a,b in the direction indicated by arrow "A" in FIG. 24(a) toward the hydration chamber assembly 89 until it reaches the hydration assembly transfer point indicated by the arrow labelled "B" in FIG. 24(b) where effective transfer of the front curve mold assemblies containing polymerized contact lenses to the hydration chamber takes place. The transfer of the front curve mold assemblies will be explained in detail below and in further detail in above-mentioned co-pending U.S. patent application Ser. No. 08/258,556, now U.S. Pat. No. 5,476, 111 entitled "Automated Method and Apparatus for Hydrating Soft Contact Lenses". After the transfer pallet 216 reaches the transfer point a vacuum gripping matrix (not shown) of hydration assembly 89 is actuated to remove up to thirty-two (32) front curve lens mold portions at a time from the four pallets on the transfer pallet 216 and transfer them to an appropriate receiving device located in front of a de-ionized water bath. The transfer pallet 216 and plate 219 carrying empty pallets 12a now reciprocates along tracks 218a,b in the direction indicated by arrow "C" in FIG. 24(c) back to its original position. The empty pallets are removed from plate 219 on to the return conveyor 31f when the incoming set of new pallets containing front curves are pushed onto the plate by pusher arm 210. Specifically, pusher arm 210 pushes a first set of new pallets 12a on the plate 219 to cause the first set of two empty pallets to exit the plate 219 and engage the conveyor 31f for recirculation back to the front curve pick-up point. Likewise, pusher arm 210 pushes a second set of new pallets 12a on the plate 219 which causes the first set of previously positioned new pallets to advance on the plate 219 and enable the second set of two empty pallets to exit the plate 219 and engage the conveyor 31f for recirculation to the front curve supply pick-up point. As illustrated in FIG. 20 the return conveyor 31f connects with the front curve supply conveyor 27 to return the empty pallets two at a time to the front curve pick-up point. Suitable pushing means 222 having reciprocating push arm 224 pushes the pallets onto the supply conveyor 27 where they are conveyed to the front curve injection mold assembly 20 to receive a new set of eight front curve mold halves in the manner described above.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

We claim:

1. A method of using a production line pallet for carrying a plurality of contact lens mold assemblies throughout a contact lens production line facility for sequential automated processing of the assemblies at a plurality of automated stations in the production line, said method comprising:

(a) providing a pallet;

(b) providing a plurality of recesses in a surface of said pallet for receiving and positioning a plurality of individual contact lens mold assemblies for automated processing, each contact lens mold assembly comprising a first mold half and a complementary second mold half;

(c) providing a registration means in said pallet for enabling precise positioning of said pallet at said plurality of automated stations in said production line facility, said recesses and said registration means cooperating to position said contact lens assemblies for automated processing of said assemblies at a plurality of said automated stations; and (d) providing a vacuum using an outer perimeter of said pallet surface which cooperates with a vacuum seal at one of said automated stations to create, with said pallet, a sealed volume for processing said mold assemblies under vacuum.

2. The method of claim 1, wherein said registration means in said pallet includes one or more locating bushings at precise locations at said pallet surface.

3. The method of claim 2, wherein said one or more locating bushings allow precise positioning of said pallet at said stations to within about +0.1 mm and −0.1 mm tolerance.

4. The method of claim 1, wherein said registration means in said pallet includes at least one pair of grooves in outer peripheral edges of said pallet to provide a precise vertical orientation of said pallet surface and said mold assemblies with respect to one or more automated stations.

5. The method of claim 1 further including the step of depositing a polymerizable monomer in one of said mold halves within said sealed volume.

6. The method of claim 1 further including the step of enabling viewing of the contact lens production at said pallet surface by providing a second recess located in said pallet for accommodating an optic viewing device for viewing production operations at specific stations throughout said contact lens production line facility.

7. A method of using a production line pallet for carrying a plurality of contact lens mold assemblies throughout a contact lens production line facility for sequential automated processing of the assemblies at a plurality of automated stations in the production line, said method comprising:

(a) providing a pallet;

(b) providing a plurality of recesses in a surface of said pallet for receiving and positioning a plurality of individual contact lens mold assemblies for automated processing; and (c) providing a vacuum using an outer perimeter of said pallet surface which cooperates with a vacuum seal at one of said automated stations to create, with said pallet, a sealed volume for processing said mold assemblies under vacuum.

* * * * *